(12) United States Patent
Colsen et al.

(10) Patent No.: US 11,548,585 B2
(45) Date of Patent: Jan. 10, 2023

(54) HANDGUARD FOR A BICYCLE HANDLE

(71) Applicant: GEO Handguards, LLC, Pawcatuck, CT (US)

(72) Inventors: Sean Colsen, North Stonington, CT (US); Glenn Olsen, East Lyme, CT (US)

(*) Notice: Subject to any disclaimer, the term of this patent is extended or adjusted under 35 U.S.C. 154(b) by 0 days.

(21) Appl. No.: 17/092,537

(22) Filed: Nov. 9, 2020

(65) Prior Publication Data

US 2021/0139100 A1    May 13, 2021

Related U.S. Application Data

(60) Provisional application No. 62/933,275, filed on Nov. 8, 2019.

(51) Int. Cl.
| | | |
|---|---|---|
| *B62K 21/12* | (2006.01) | |
| *B62K 21/26* | (2006.01) | |
| *B62J 23/00* | (2006.01) | |

(52) U.S. Cl.
CPC .......... *B62K 21/125* (2013.01); *B62K 21/26* (2013.01); *B62J 23/00* (2013.01)

(58) Field of Classification Search
CPC ......... B62K 21/125; B62K 21/26; B62J 23/00
See application file for complete search history.

(56) References Cited

U.S. PATENT DOCUMENTS

| | | | | |
|---|---|---|---|---|
| 3,832,912 A | * | 9/1974 | Edwards ............... | B62M 25/04 74/551.8 |
| 4,438,661 A | * | 3/1984 | Cullen .................. | B62K 21/26 74/551.9 |
| 5,491,996 A | * | 2/1996 | Baarman ............... | B21D 7/025 72/128 |
| 2012/0279348 A1 | * | 11/2012 | Wood ..................... | B62J 23/00 74/551.8 |
| 2016/0046343 A1 | * | 2/2016 | Ross ..................... | B62K 21/12 74/551.8 |

* cited by examiner

*Primary Examiner* — Vicky A Johnson
(74) *Attorney, Agent, or Firm* — Steven M. McHugh

(57) ABSTRACT

A handguard system for a handlebar of a bicycle is provided and includes a handguard article having a handguard first end communicated with a handguard second end via a handguard center portion, wherein the handguard second end is configured to associate with the handlebar. The handguard system also includes a handguard collar, wherein the handguard collar includes a handguard collar structure which defines a collar cavity configured to contain the handlebar and having a collar cavity diameter CCD which is configurable between a first collar cavity diameter $CC_{D1}$ and a second collar cavity diameter $CC_{D2}$. and Additionally, the handguard system further includes a handguard mounting device, wherein the handguard mounting device is configured to securingly associate with the handguard first end and the handlebar, wherein when the handguard article is securingly associated with the handlebar, the handguard center portion is configured to cover a portion of the handlebar.

12 Claims, 28 Drawing Sheets

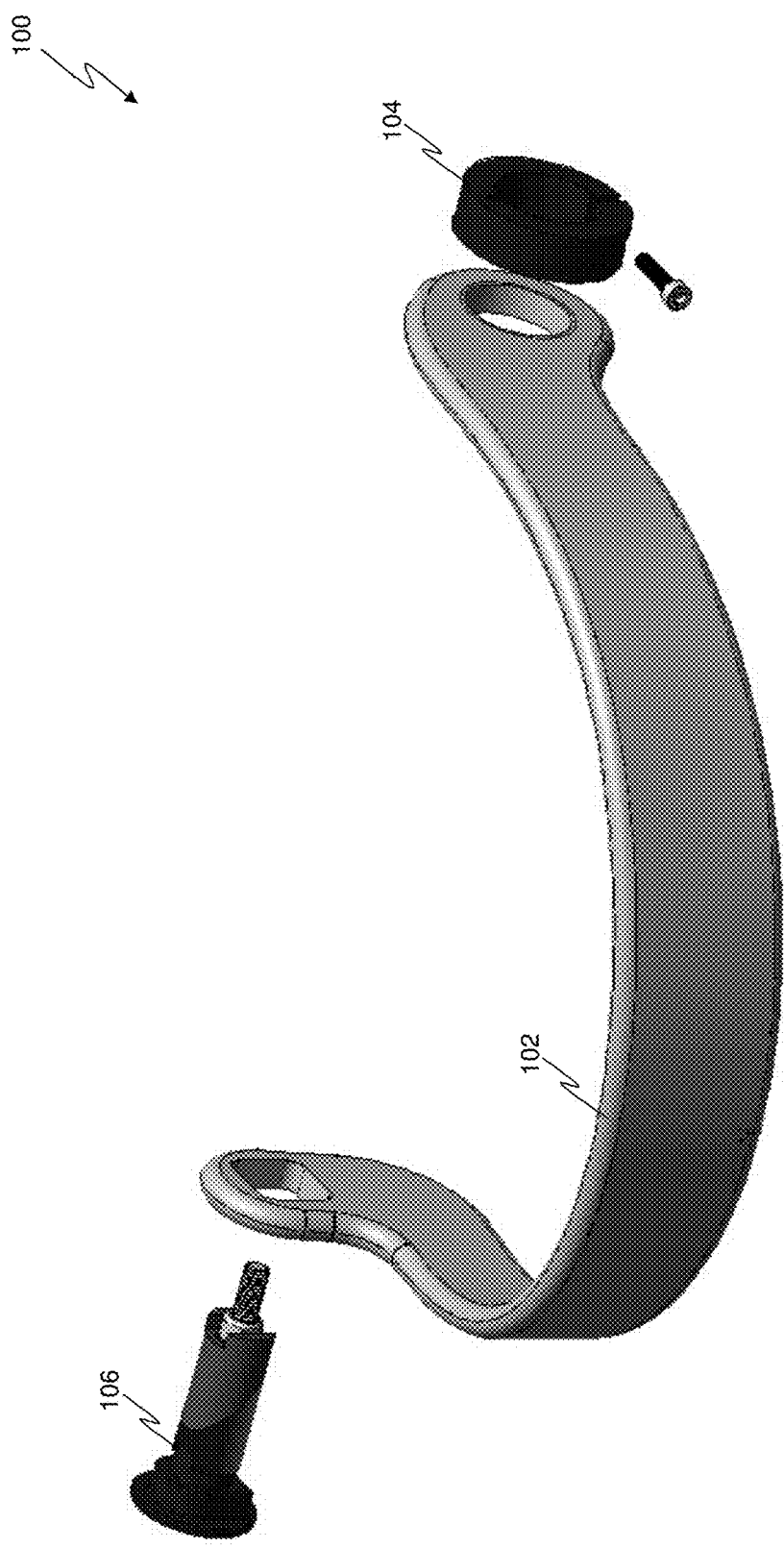

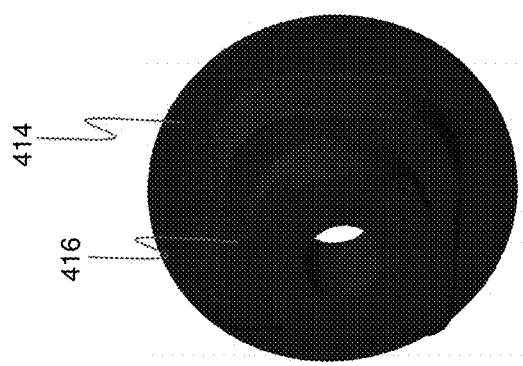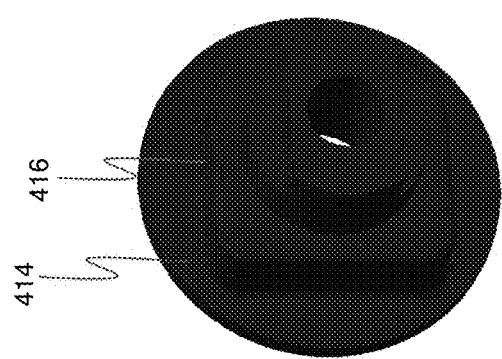
FIG. 5D

HANDGUARD FOR A BICYCLE HANDLE

RELATED APPLICATIONS

This application is related to and claims the benefit of the filing date of U.S. Provisional Patent Application Ser. No. 62/933,275 filed Nov. 8, 2019, the contents of which are incorporated herein by reference in its entirety.

FIELD OF THE INVENTION

The present invention relates generally to a protective device for a bicycle, and more particularly to a handguard for a bicycle handle.

BACKGROUND OF THE INVENTION

Bicycles were introduced in the $19^{th}$ century and have been increasing in popularity ever since. In fact, it is estimated that by the early $21^{st}$ century there were over 1 billion bicycles in existence across the globe at any given time, thus outnumbering automobiles. During this time, bicycles have had such an impact on society, that several well-known components, such as ball bearings, pneumatic tires, chain-driven sprockets and tension spoked wheels, were all invented for use on the bicycle. Bicycles have many different styles and shapes and have been adapted for many difference purposes, such as general transportation, exercise, sport, toys and business (such as bike couriers). In fact, in many regions around the world (such as China), bicycles have become the principal means of transportation.

As a sport, biking has evolved to include several different types of sport biking, such as speed bike racing, endurance bike racing, stunt biking and off-road or mountain biking. Each of these types of biking carries a risk of injury to the rider and/or damage to the components of the bike. For example, off-road or mountain biking involves riding a specially designed bicycle, called a mountain bike, over mountainous, rough, rocky and/or wooded terrain. As such, mountain bike riders frequently encounter brush, rocks and other obstacles that can injure the rider and/or bike equipment if the bike impacts hard objects. As a mode of transportation and as business couriers, bikes are riding on roads and paths with other bikes, automobiles and pedestrians. Thus, it is common to see bicycles and bicycle riders involved in accidents with other bicycles, as well as with automobiles and pedestrians. This is especially true at nighttime or during the dark. Accordingly, a common injury among bicyclists involve hand and finger injuries and damage to components located on the ends of the handlebar, such as brake handles.

One reason for this is that the handlebar of the bicycle extends outwardly from the sides of the front of the bike. Accordingly, the handlebar and/or handlebar grips are more susceptible to impacting an object, such as a pole, a vehicle, brush, pedestrian, etc, as that object is being passed by the bike than are other parts of the bicycle. Moreover, because the riders hands are located on this protruding section of the handlebar, this makes the hands of the rider more susceptible to injury during object impact. This is undesirable because when the handlebar and/or handlebar grip contacts a hard object, the hand of the rider may become seriously injured and/or components of the bike may become damaged and unusable.

SUMMARY OF THE INVENTION

A handguard system for a handlebar of a bicycle is provided in accordance with one embodiment of the invention and includes a handguard article, wherein the handguard article includes a handguard first end communicated with a handguard second end via a handguard center portion and wherein the handguard second end is configured to associate with the handlebar. The handguard system also includes a handguard collar, wherein the handguard collar includes a handguard collar structure which defines a collar cavity configured to contain the handlebar and having a collar cavity diameter CCD which is configurable between a first collar cavity diameter $CC_{D1}$ and a second collar cavity diameter $CC_{D2}$. and Additionally, the handguard system further includes a handguard mounting device, wherein the handguard mounting device is configured to securingly associate with the handguard first end and the handlebar, wherein when the handguard article is securingly associated with the handlebar, the handguard center portion is configured to cover a portion of the handlebar.

A handguard system for a handlebar of a bicycle is provided in accordance with one embodiment of the invention, wherein the handlebar includes a handlebar structure having a handlebar end and defining a handlebar end cavity. The handguard system includes a handguard article, wherein the handguard article includes a handguard first end communicated with a handguard second end via a handguard center portion, wherein the handguard first end defines a first mounting opening and the handguard second end defines a second mounting opening and wherein the second mounting opening includes a second mounting opening diameter $M_d$ which is sized to receive and contain the handlebar structure. The handguard system further includes a handguard collar, wherein the handguard collar includes a handguard collar structure which defines a collar cavity configured to contain the handlebar structure, wherein the collar cavity includes a collar cavity diameter CCD which is configurable between a first collar cavity diameter $CC_{D1}$ and a second collar cavity diameter $CC_{D2}$. Moreover, the handguard system also includes a handguard mounting device, wherein the handguard mounting device is configured to associate with the handguard first end and includes a mounting device expansion portion, wherein the mounting device expansion portion is configured to be contained within the handlebar end cavity to securingly associate the handguard first end with the handlebar end, wherein when the handguard article is associated with the handlebar, the handguard center portion is configured in an arch shape to cover a portion of the handlebar end.

A method for associating handguard article with a handlebar of a bicycle is provided wherein the method includes associating the handguard collar with the bicycle handlebar, associating the handguard second end with the bicycle handlebar to be located proximate the handguard collar; associating the handguard mounting device with the handguard article and associating the handguard mounting device with the bicycle handlebar to be located proximate the end of the bicycle handlebar.

BRIEF DESCRIPTION OF THE DRAWINGS

The foregoing and other features and advantages of the present invention should be more fully understood from the accompanying detailed description of illustrative embodiments taken in conjunction with the following Figures in which like elements are numbered alike in the several Figures:

FIG. 1B shows a top side isometric view of the handguard system of FIG. 1.

FIG. 5D shows a bottom left side view and a bottom right side view of the mounting device end cap of the handguard mounting device of FIG. 5A, in accordance with one embodiment.

DETAILED DESCRIPTION OF THE INVENTION

Figure 1A:
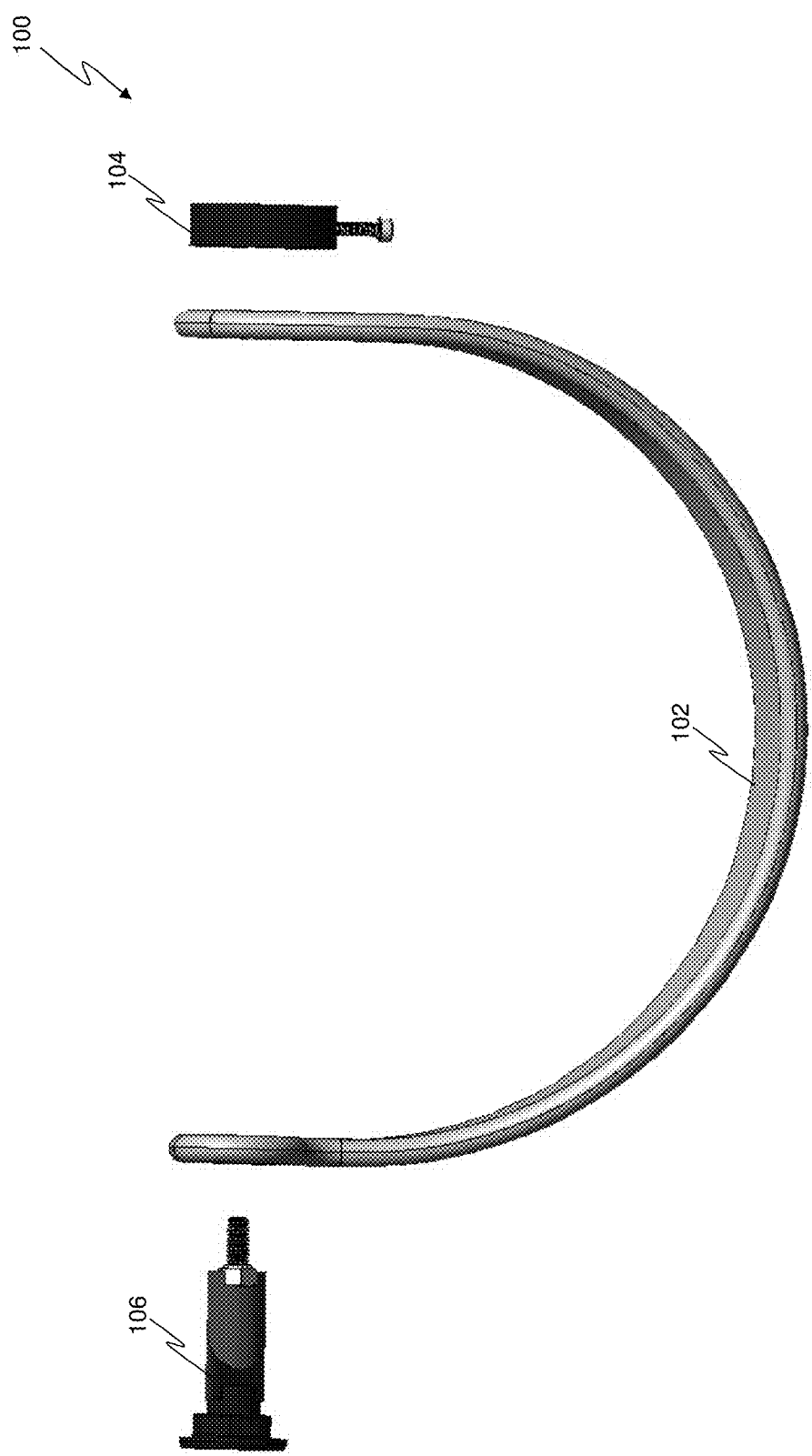
FIG. 1A shows a side view of the Handguard system, in accordance with one embodiment of the invention.
Figure 1C:
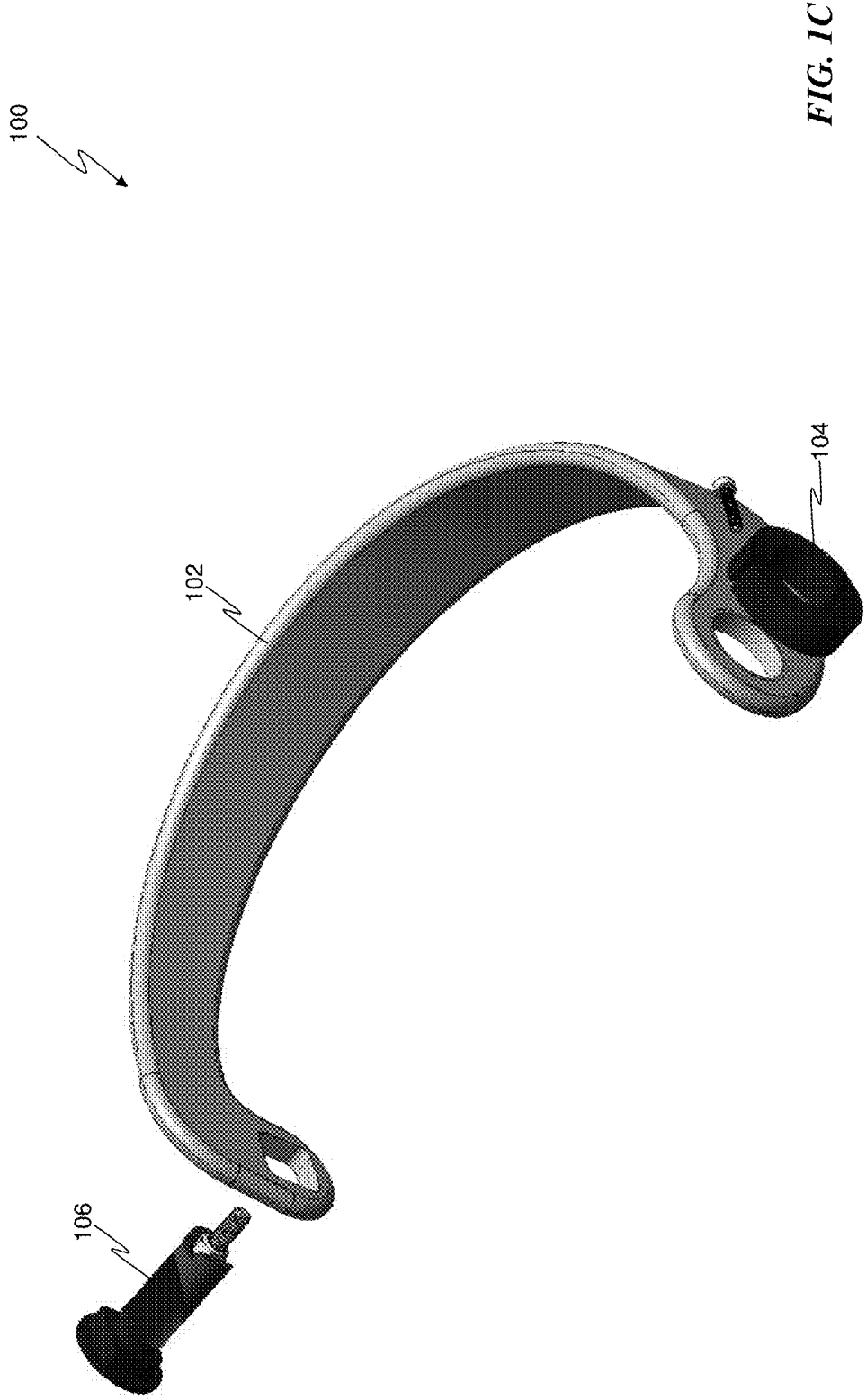
FIG. 1C shows a bottom side isometric view of the handguard system of FIG. 1.
Figure 1D:
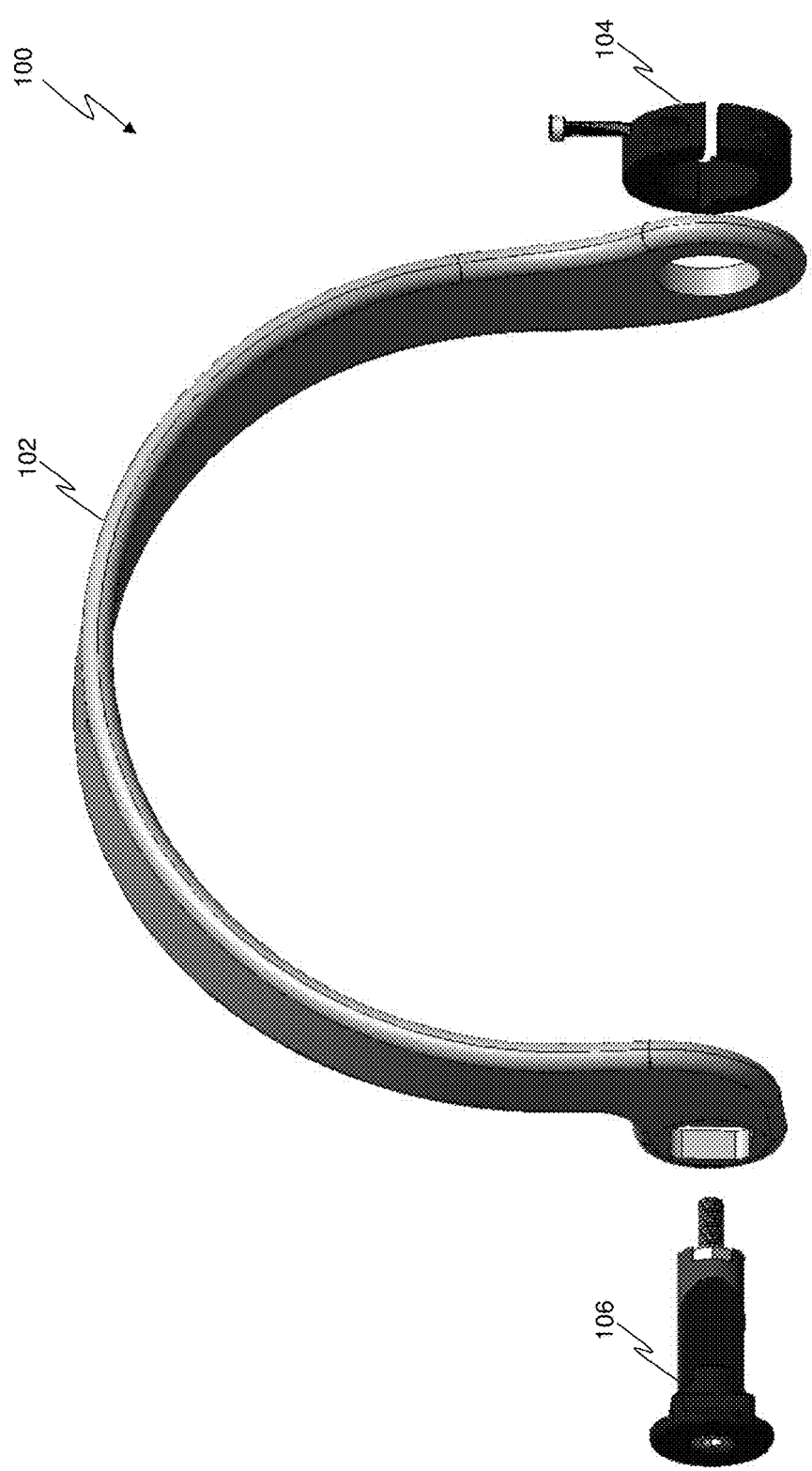
FIG. 1D shows a rear side isometric view of the handguard system of FIG. 1.
Figure 2A:
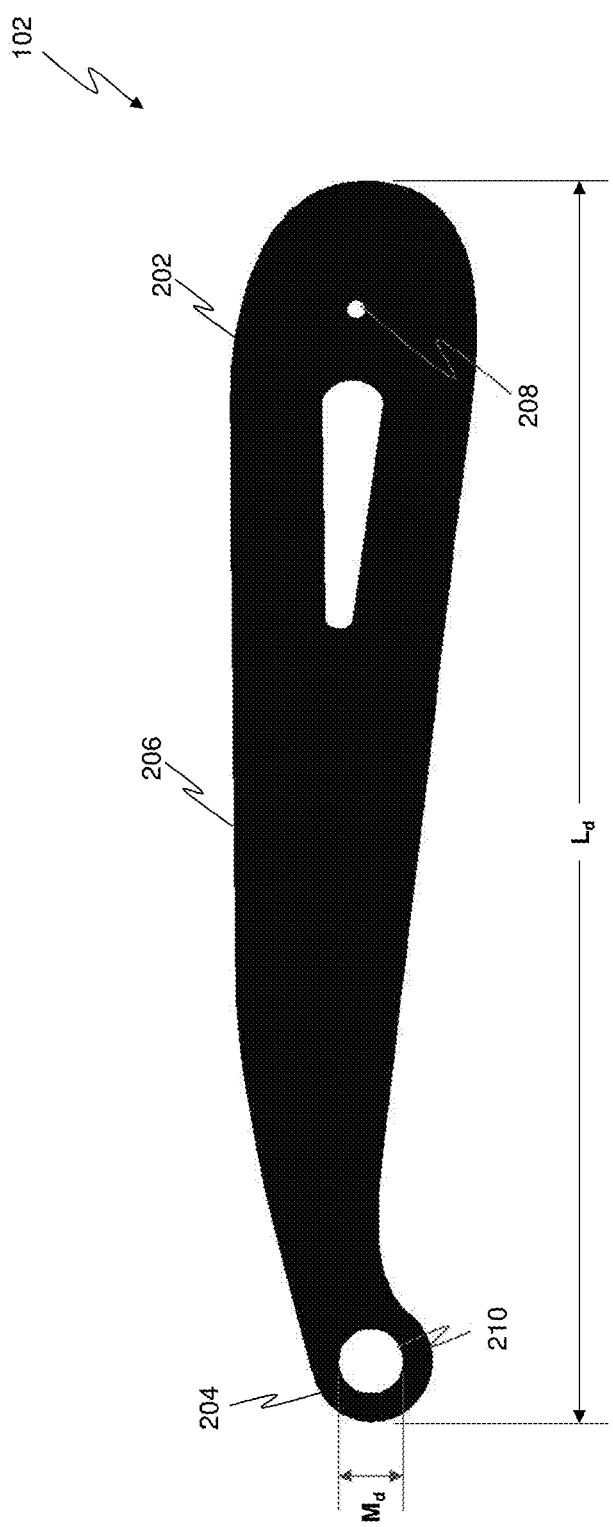
FIG. 2A shows a side view of a handguard article for use with the handguard system of FIG. 1, in accordance with one embodiment of the invention.
Figure 2B:
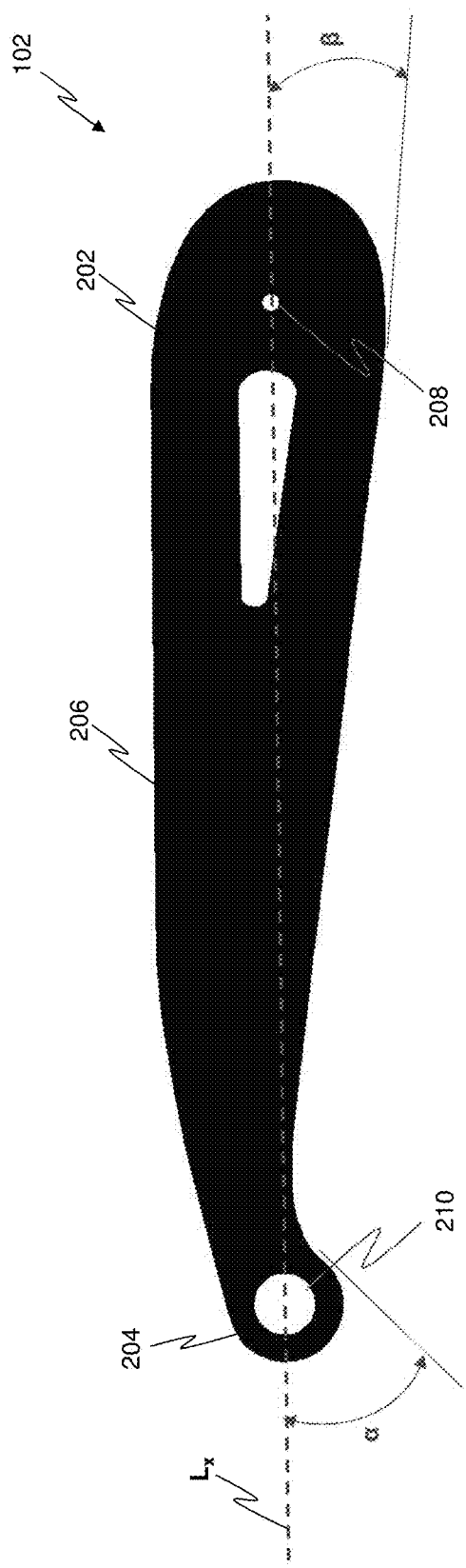
FIG. 2B shows a side view of the handguard article of FIG. 2A.
Figure 2C:
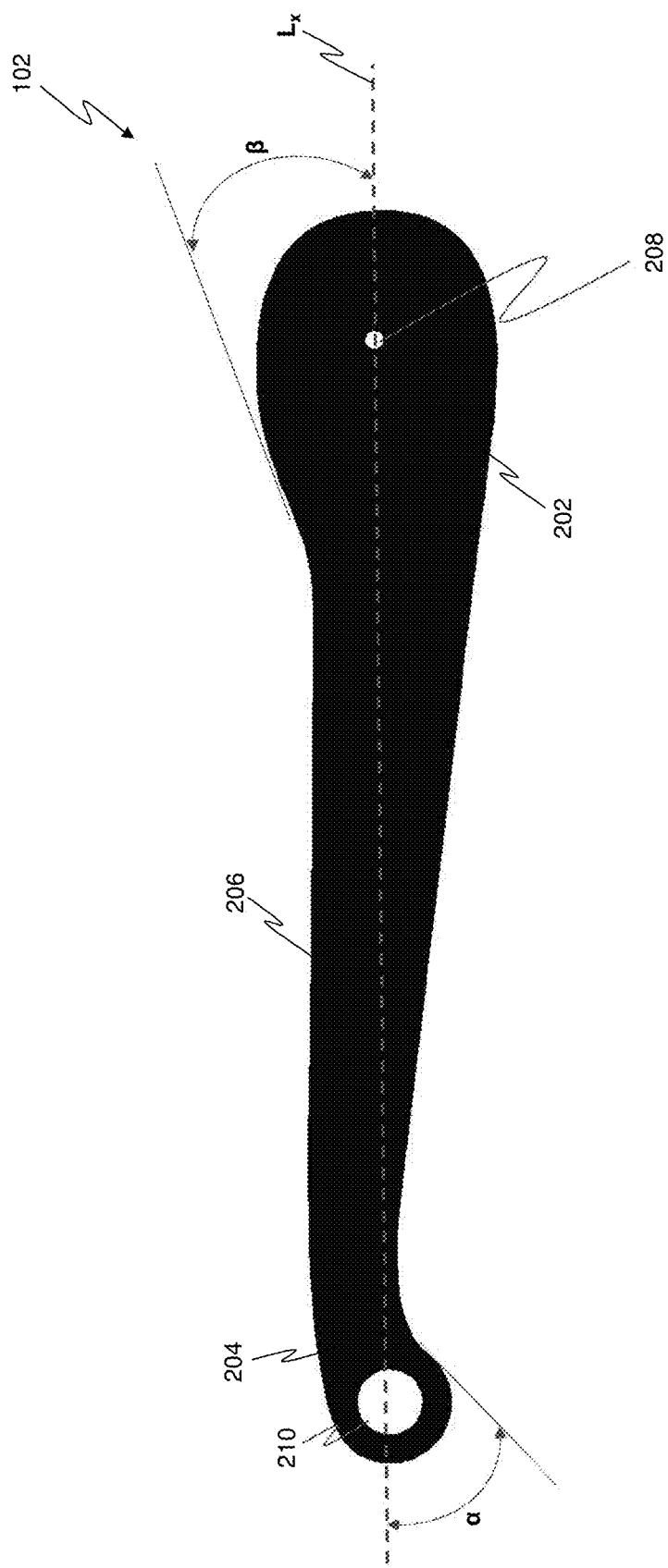
FIG. 2C shows a side view of the handguard article, in accordance with another embodiment of the invention.
Figure 2D:
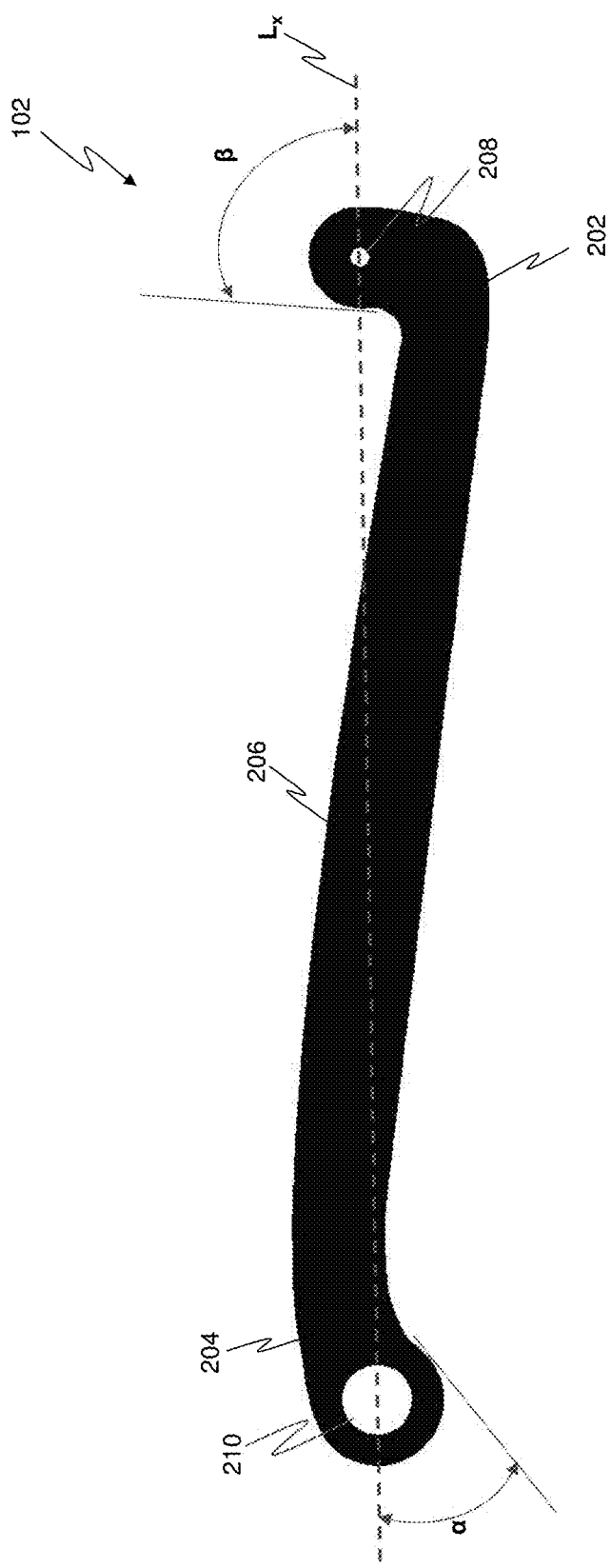
FIG. 2D shows a side view of the handguard article, in accordance with still yet another embodiment of the invention.

In accordance with one embodiment of the invention, a handguard system for a bicycle handlebar is provided and is configured to protect the hands of a bicycle rider and the bicycle handlebar grips by limiting and/or preventing objects from contacting the handlebar grips and/or items (such as hands, brake handles, etc.) that are located proximate the end grip of the bicycle handlebars. This unique and novel invention acts to protect hands and bicycle components, such as grips, brake handles, shifters, dropper post levers, lights and other accessories, from impact by trees, brush, pedestrians, signs, poles, buildings, rocks and other hard and/or potentially injurious and damaging objects.

Referring to FIG. 1A, FIG. 1B, FIG. 1C and FIG. 1D, a handguard system 100 for a bicycle is shown, in accordance with one embodiment of the invention and includes a handguard article 102, a handguard collar 104 and a handguard mounting device 106.

Referring to FIG. 2A, FIG. 2B, FIG. 2C and FIG. 2D embodiments of the handguard article 102 are shown and include a handguard length La, a handguard first end 202, a handguard second end 204 and a handguard center portion 206, wherein the handguard center portion 206 connects the handguard first end 202 with the handguard second end 204. The handguard first end 202 defines a first mounting opening 208 and the handguard second end 204 defines a second mounting opening 210, wherein the handguard second mounting opening 210 includes a second mounting opening diameter Ma. It should be appreciated that, in at least one embodiment, the second mounting opening diameter Ma may be sized and shaped to snugly contain a portion of a handlebar (or handlebar grip in other embodiments) of a bicycle. It should be further appreciated that in one or more embodiments (See FIG. 2A, FIG. 2B, FIG. 2C and FIG. 2D), the handguard first end 202 may be offset at an angle β from a longitudinal axis $L_x$ which runs parallel with the handguard center portion 206, wherein β is an angle that ranges between 0° and 110°. Additionally, in one or more embodiments (again see FIG. 2A, FIG. 2B, FIG. 2C and FIG. 2D) the handguard second end 204 may be offset at an angle α from a longitudinal axis which runs parallel with the handguard center portion 106, wherein α is an angle that ranges between 0° and 110°.

Figure 3:
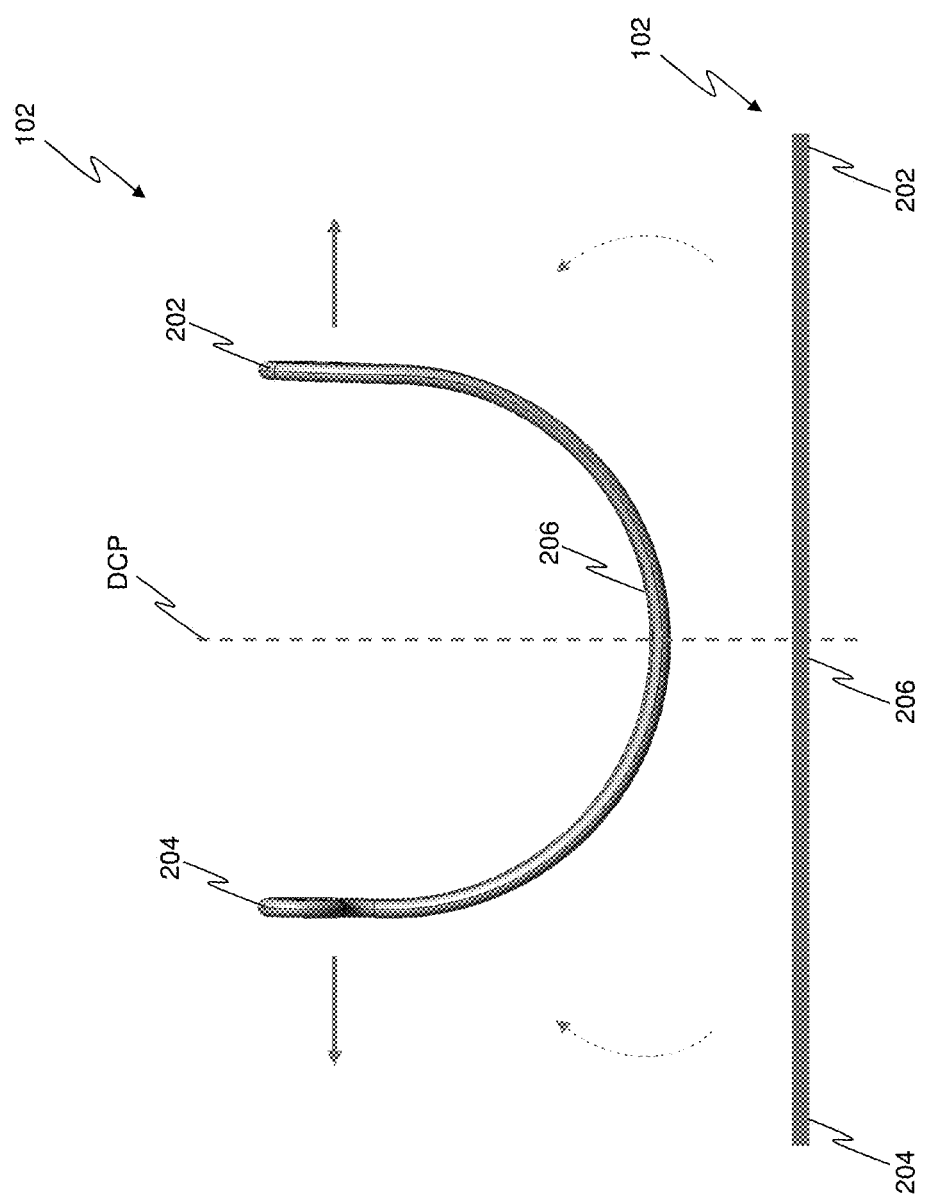
FIG. 3 shows a side view of a handguard article for use with the handguard system of FIG. 1 configured into an arch shape, in accordance with one embodiment of the invention.
Figure 4A:
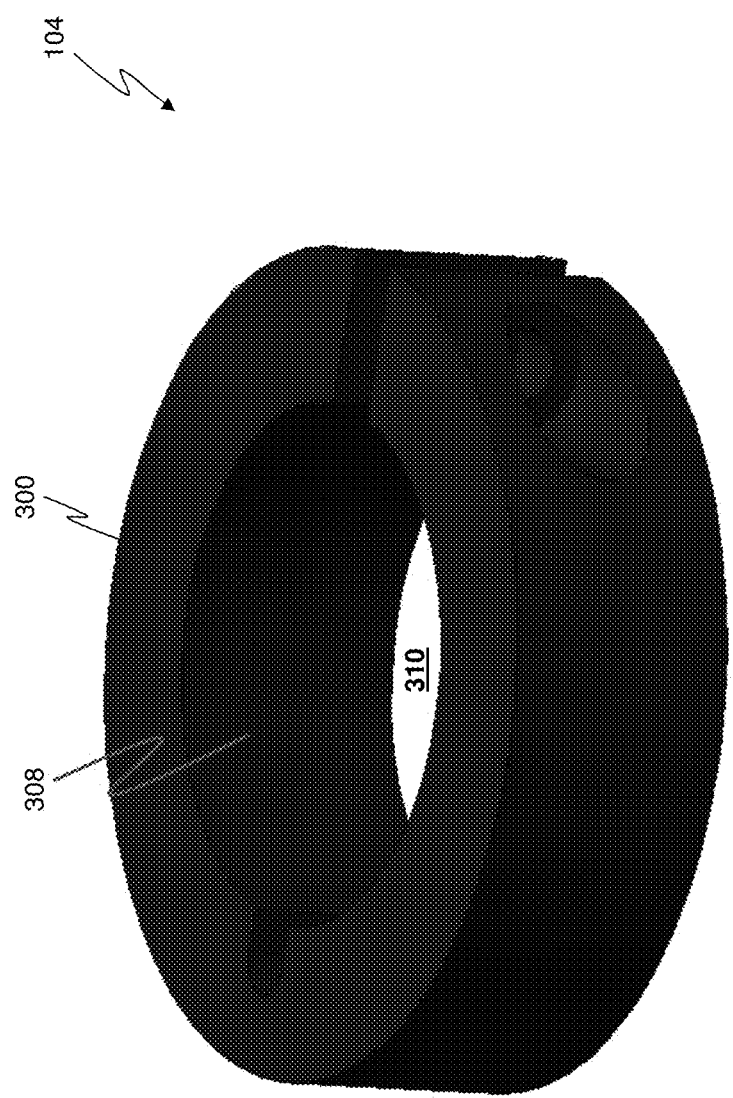
FIG. 4A shows a side isometric view of a handguard collar for use with the handguard system of FIG. 1, in accordance with one embodiment of the invention.
Figure 4B:
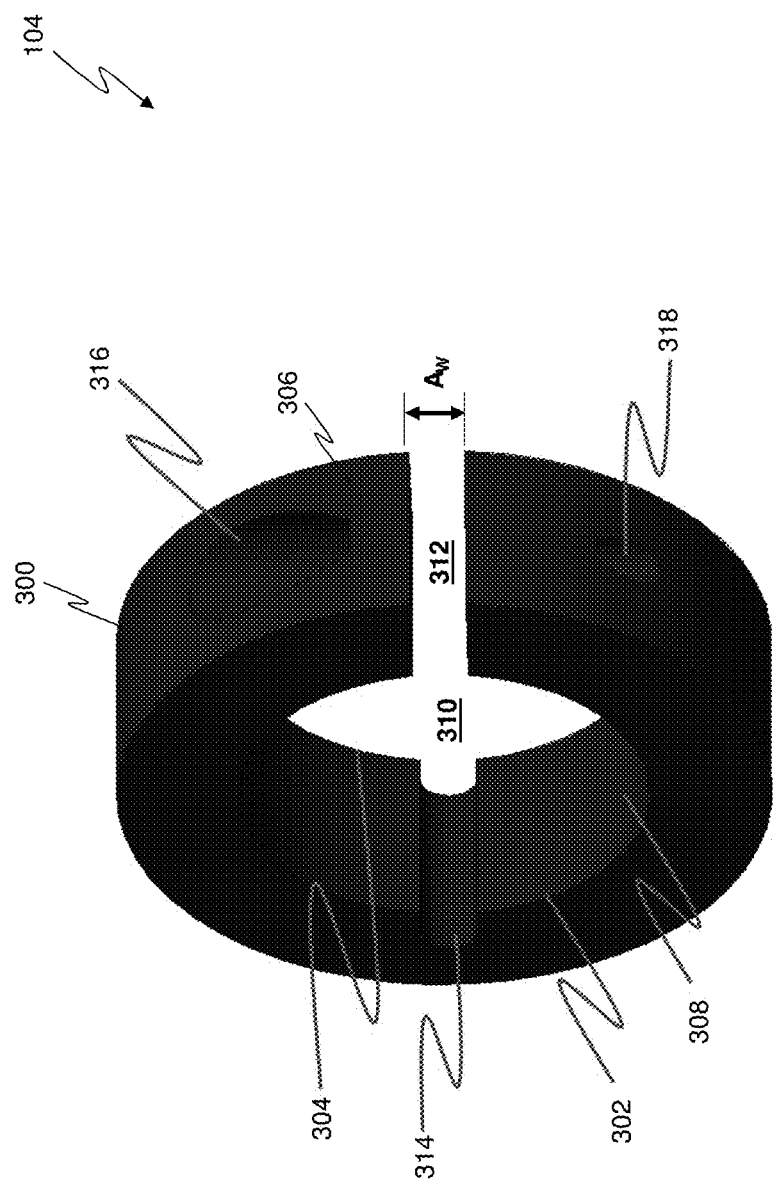
FIG. 4B shows a front side isometric view of the handguard collar of FIG. 4A.
Figure 4C:
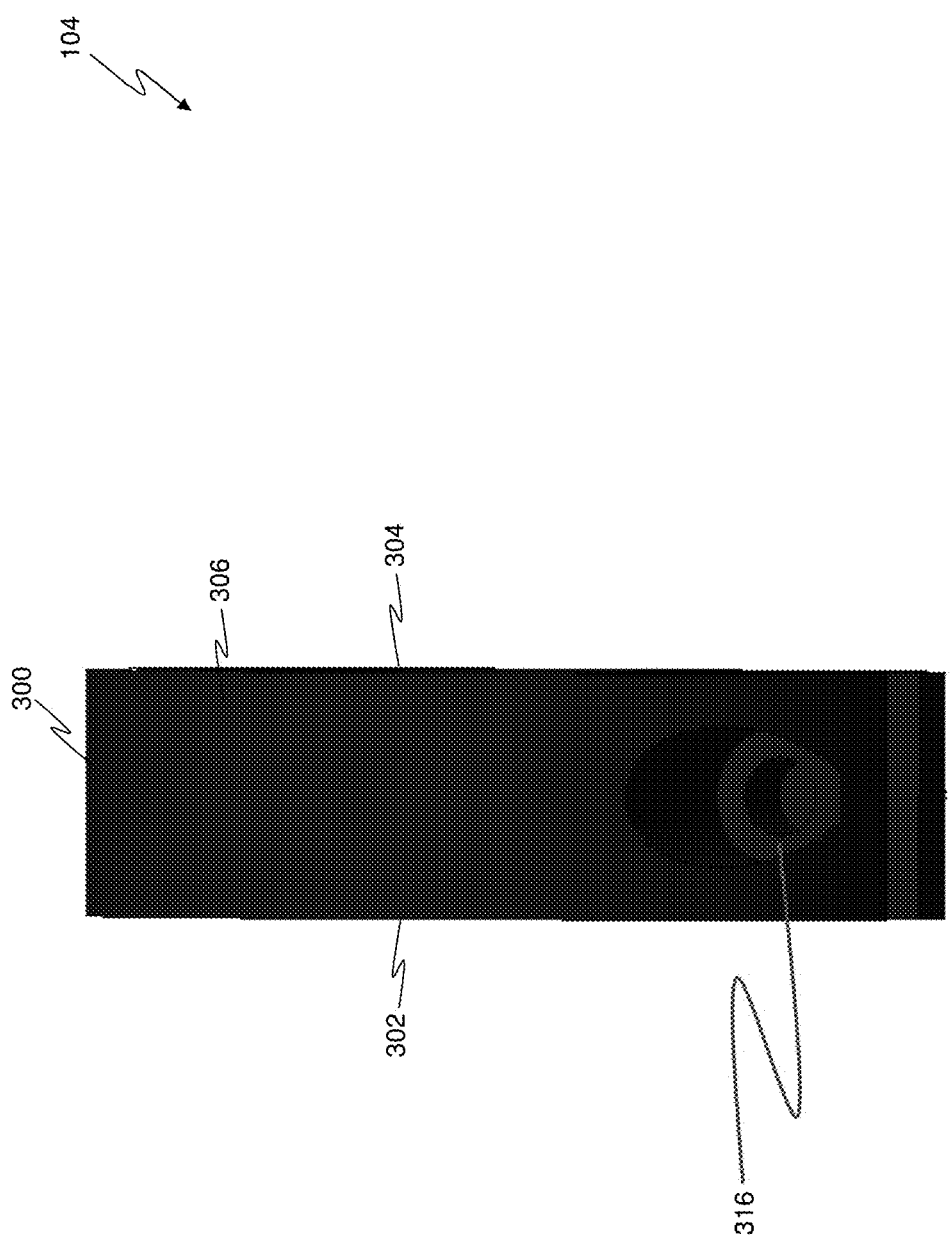
FIG. 4C shows a top front side view of the handguard collar of FIG. 4A.
Figure 4D:
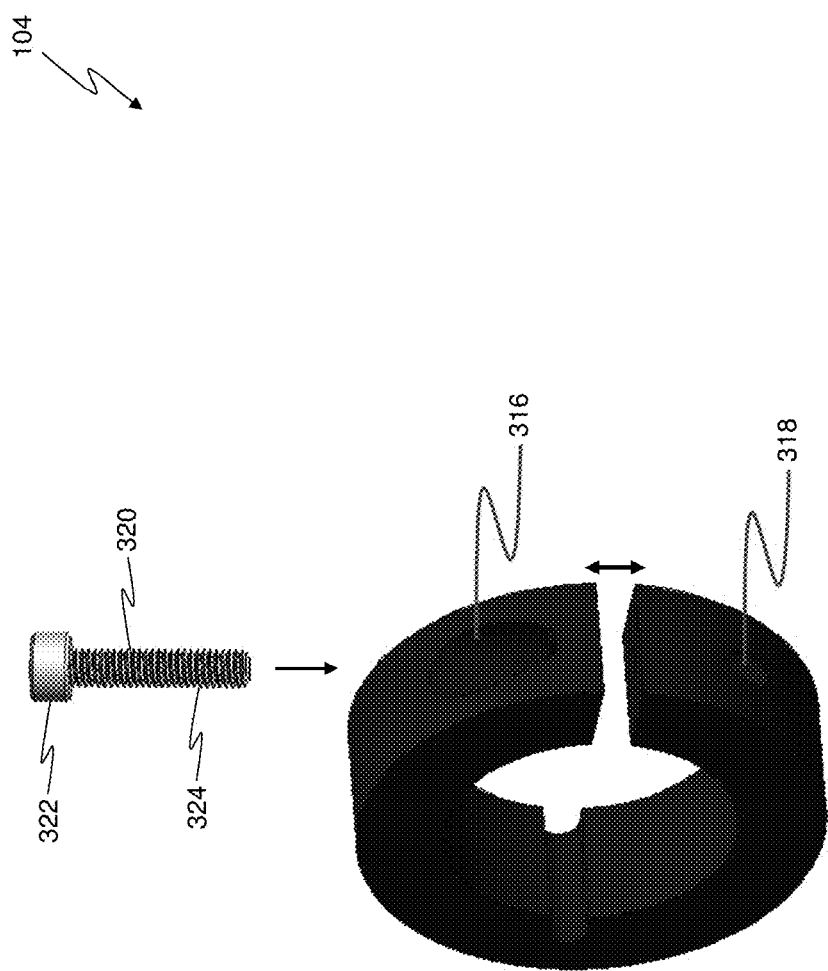
FIG. 4D shows a front side isometric view of the handguard collar of FIG. 4A.

It should be further appreciated that the second mounting opening diameter $M_d$ may be sized to snugly contain a handlebar of a bicycle and thus, may be configured for a particular handlebar size and/or may be configured to fit various and/or differing handlebar sizes via the handguard collar 104 or sleeve, as discussed in greater detail hereinbelow. Moreover, at least a portion of the handguard article 102 may be constructed from any material or combination of materials suitable to the desired end purpose as desired (for example, a plastic and/or rubber material) which is resilient and able to bend outwardly and/or inwardly to form an arch shape structure which, when under tension, is able to deflect obstacles from coming into contact with the end of the bicycle handlebar, controls of the bike and/or the hand of a rider. Thus, referring to FIG. 3, when the handguard first end 202 and the handguard second end 204 are bent downwardly (or upwardly) and inward toward an imaginary plane DCP extending transversely through the handguard center portion 206, the material of the handguard article 102 causes the handguard first end 202 and the handguard second end 204 to naturally have a force that pushes outwardly and away from the imaginary plane DCP extending through the handguard center portion 206.

Referring to FIG. 4A, FIG. 4B, FIG. 4C and FIG. 4D, one embodiment of the handguard collar 104 is shown and includes a handguard collar structure 300 which defines a handguard collar first opening 302 and a handguard collar second opening 304. The handguard collar structure 300 further includes a handguard collar outer wall 306 and a handguard collar inner wall 308, wherein the handguard collar inner wall 308 defines a handguard collar cavity 310 which communicates the handguard collar first opening 302 with the handguard collar second opening 304. It should be appreciated that the handguard collar cavity 310 includes a collar cavity diameter CCD which is configurable between a first collar cavity diameter $CC_{D1}$ and a second collar cavity diameter $CC_{D2}$, wherein the first collar cavity diameter $CC_{D1}$ is larger than the second collar cavity diameter $CC_{D2}$. The handguard collar structure 300 further defines an adjustment cavity 312 having an adjustment cavity width Aw, an adjustment notch 314 and a first mounting cavity 316 aligned with a threaded second mounting cavity 318. The handguard collar 104 further includes a mounting screw 320 having a mounting screw head 322 and a mounting screw threaded portion 324 extending therefrom. The first mounting cavity 316 is configured to allow the mounting screw threaded portion 324 to traverse the first mounting cavity 316 while the mounting screw head 322 is movably contained within the first mounting cavity 316. Accordingly, when the mounting screw 320 is located within the first mounting cavity 316, the mounting screw threaded portion 324 extends out of the first mounting screw cavity 316 and into the threaded second mounting cavity 318. As the mounting screw 320 is rotated, the mounting screw threaded portion 324 engages with the threaded second mounting cavity 318 to cause handguard collar structure 300 to bend at the adjustment notch 314 such that the adjustment cavity width Aw gets smaller thereby causing the handguard collar cavity 310 to become smaller. This, in turn, causes the handguard collar inner wall 308 to press against the bicycle handlebar thereby securely holding the handguard collar 104 in place. It should be appreciated that in other embodiments, the handguard collar 104 may be secured to the handlebar via any device and/or method as desired suitable to the desired end purpose, such as, for example, a quick release clamp, a friction fit device, a screw, a pin, etc.

Figure 5A:
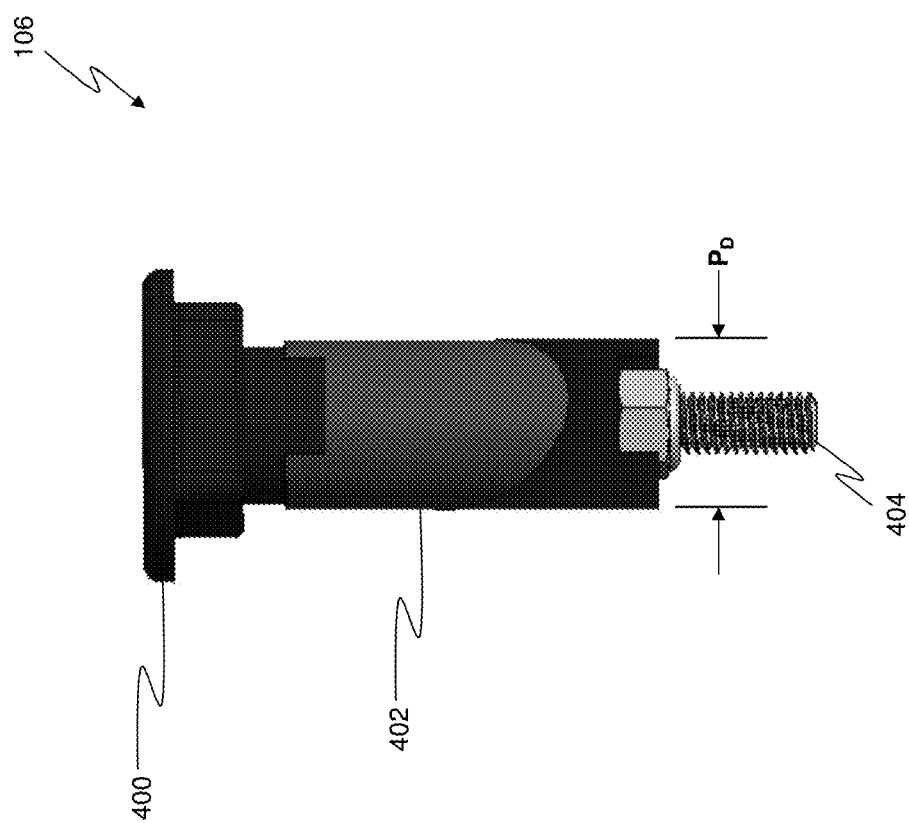
FIG. 5A shows a side view of a handguard mounting device for use with the handguard system of FIG. 1, in accordance with one embodiment of the present invention.
Figure 5B:
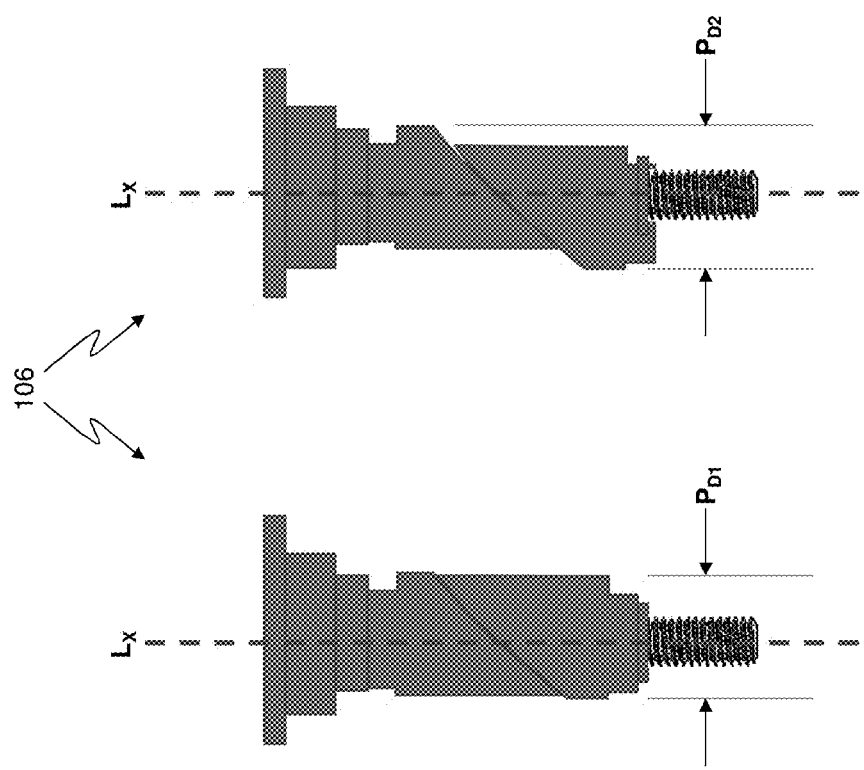
FIG. 5B shows a side view of the handguard mounting device in FIG. 5A.
Figure 5C:
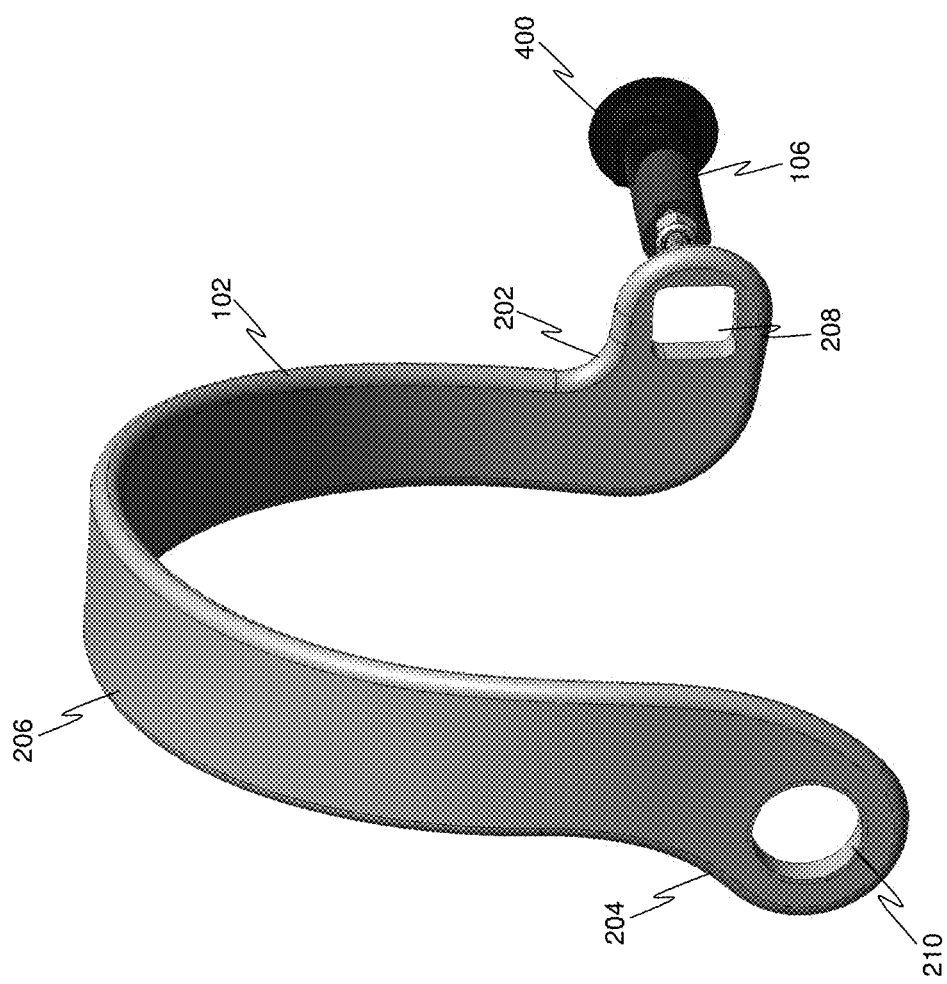
FIG. 5C shows an isometric side view of the handguard system of FIG. 1 and the handguard mounting device of FIG. 5A, in accordance with one embodiment of the present invention.
Figure 5E:
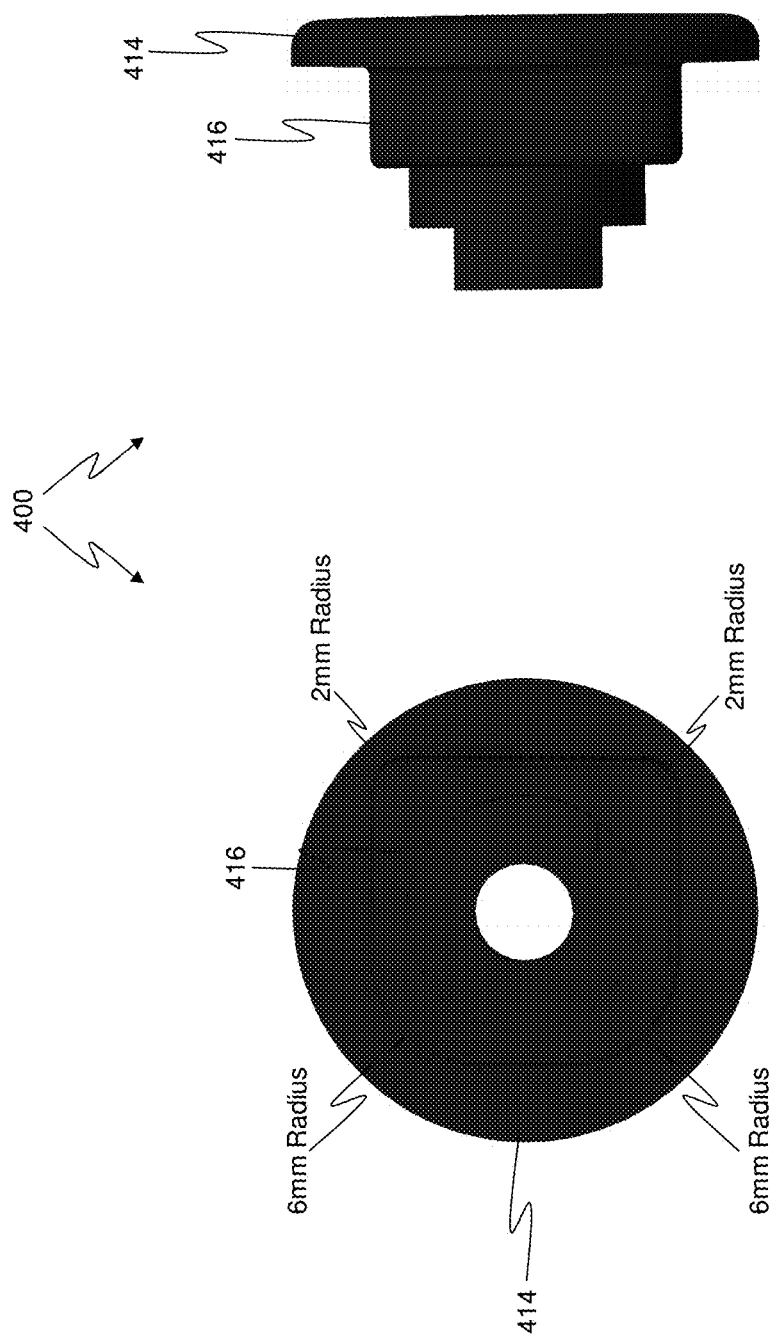
FIG. 5E shows a bottom view and a side view of the mounting device end cap of the handguard mounting device of FIG. 5A, in accordance with one embodiment.
Figure 5F:
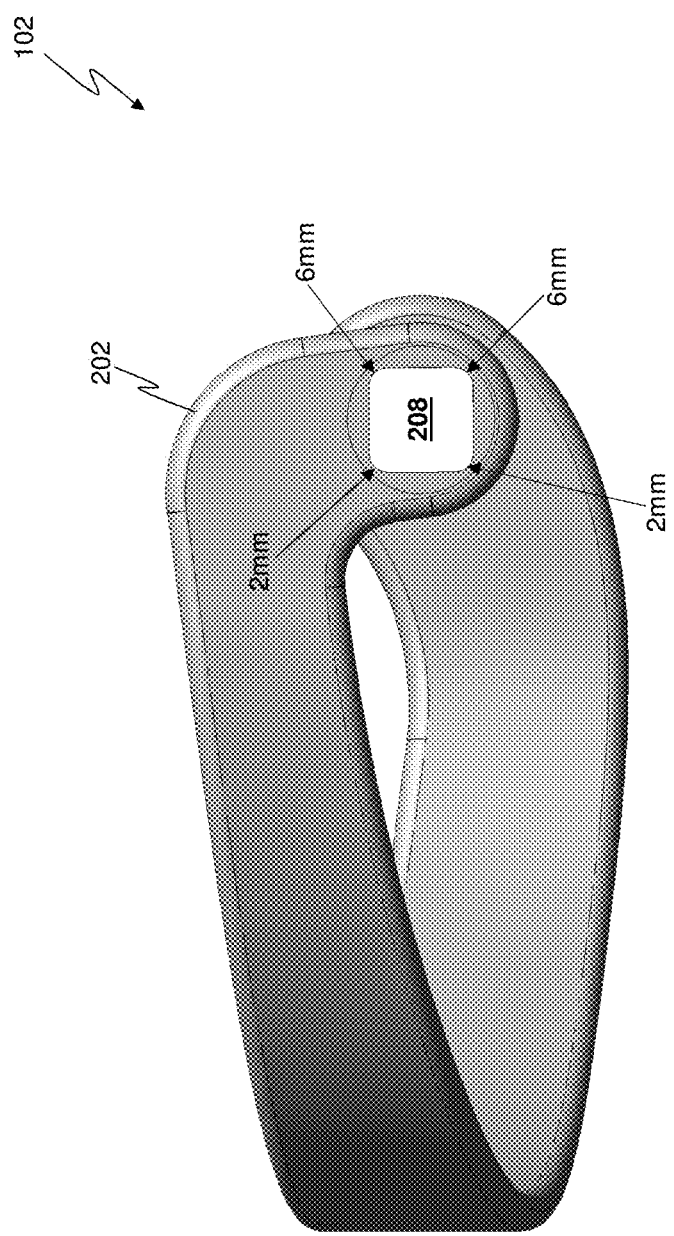
FIG. 5F shows an end view of the handguard article for use with the handguard system of FIG. 1, in accordance with one embodiment.
Figure 5G:
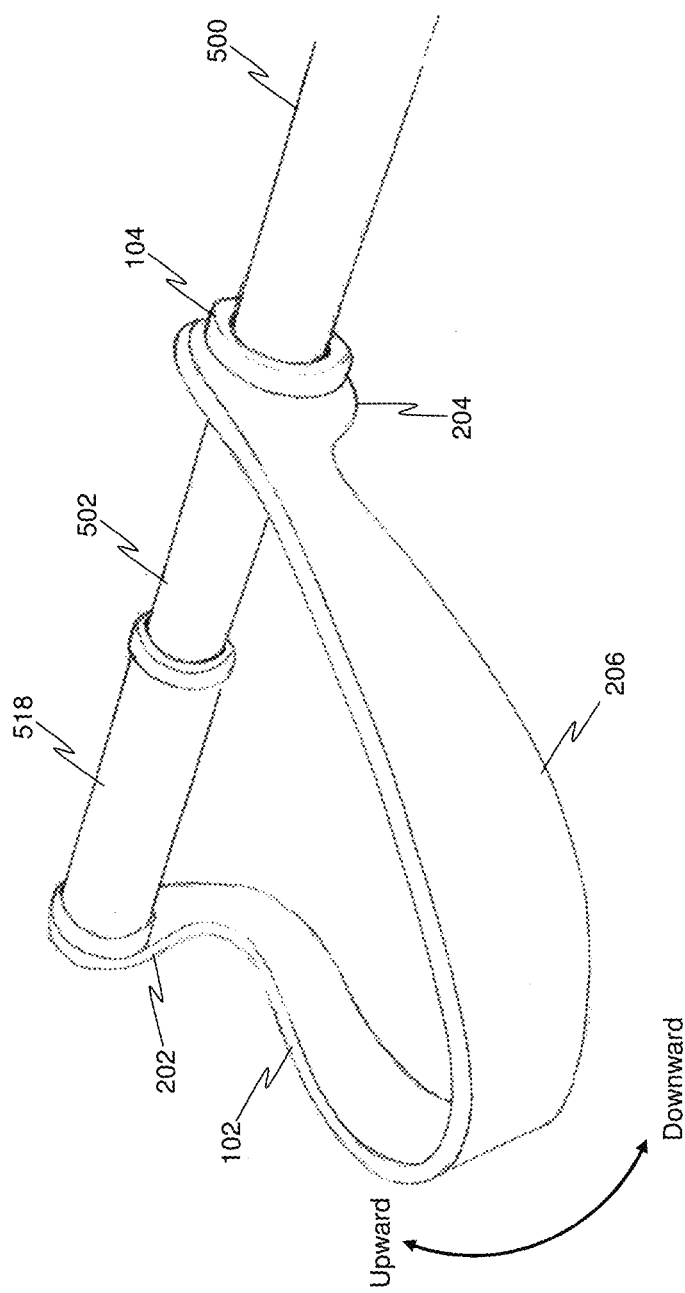
FIG. 5G shows one side of the bicycle handlebar of FIG. 7 with the handguard system of FIG. 1 associated therewith, in accordance with another embodiment of the invention.

Referring to FIG. 5A and FIG. 5B, the handguard mounting device 106 may include a mounting device end cap 400, a mounting device expansion portion 402 and a mounting device adjustment screw 404, wherein the handguard mounting device 106 is configured as a mechanical expansion plug to securely and removably associate the handguard mounting device 106 with a handlebar 500 of a bicycle 600. It should be appreciated that the mounting device expansion portion 402 includes an expansion portion first diameter and an expansion portion second diameter, wherein the expansion portion first diameter is smaller than the expansion portion second diameter. When the mounting device adjustment screw 404 is rotated, the mounting device expansion portion 402 is configurable between the expansion portion first diameter and an expansion portion second diameter.

Figure 6:
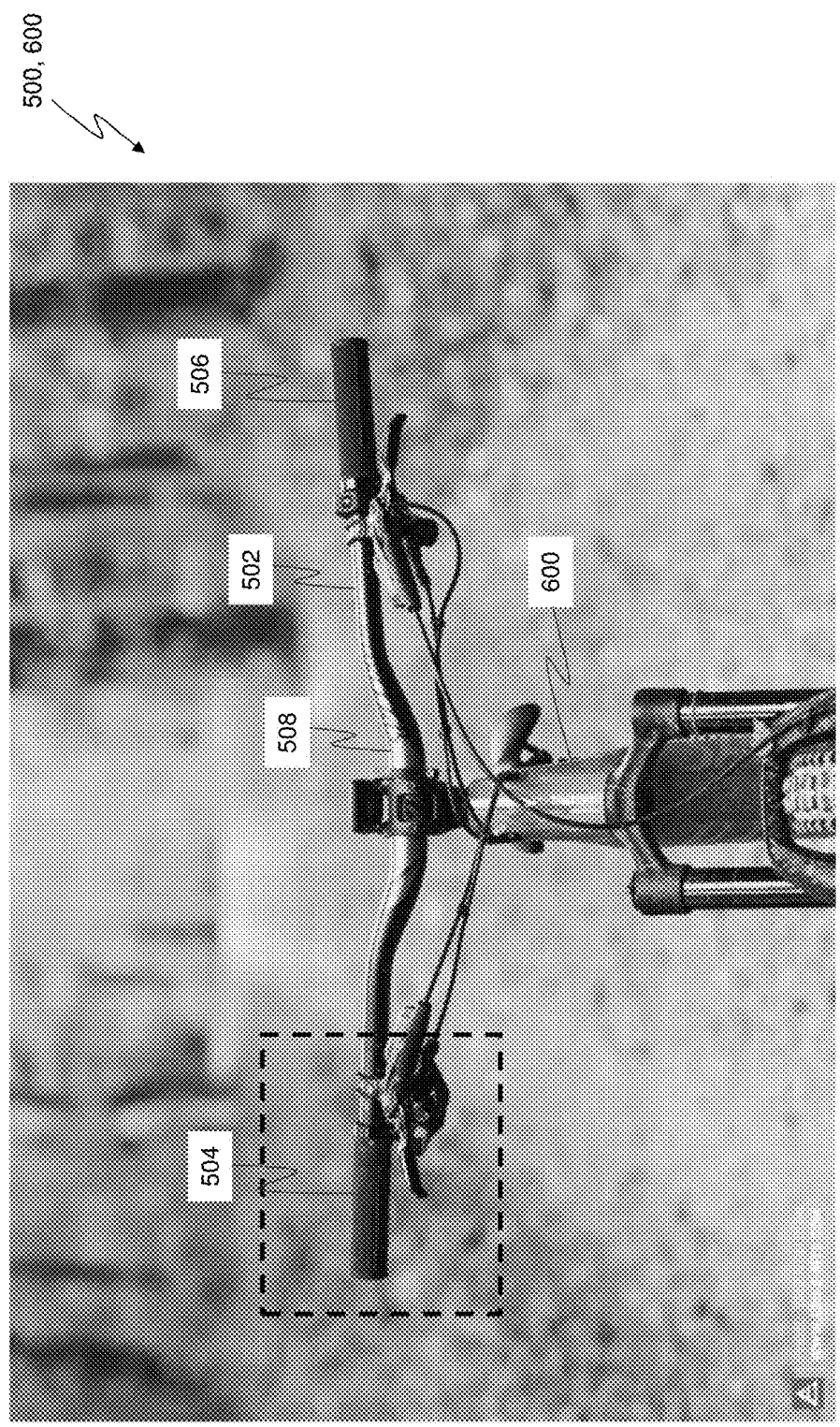
FIG. 6 shows a rear view of a bicycle with a handlebar, in accordance with the prior art.
Figure 7:
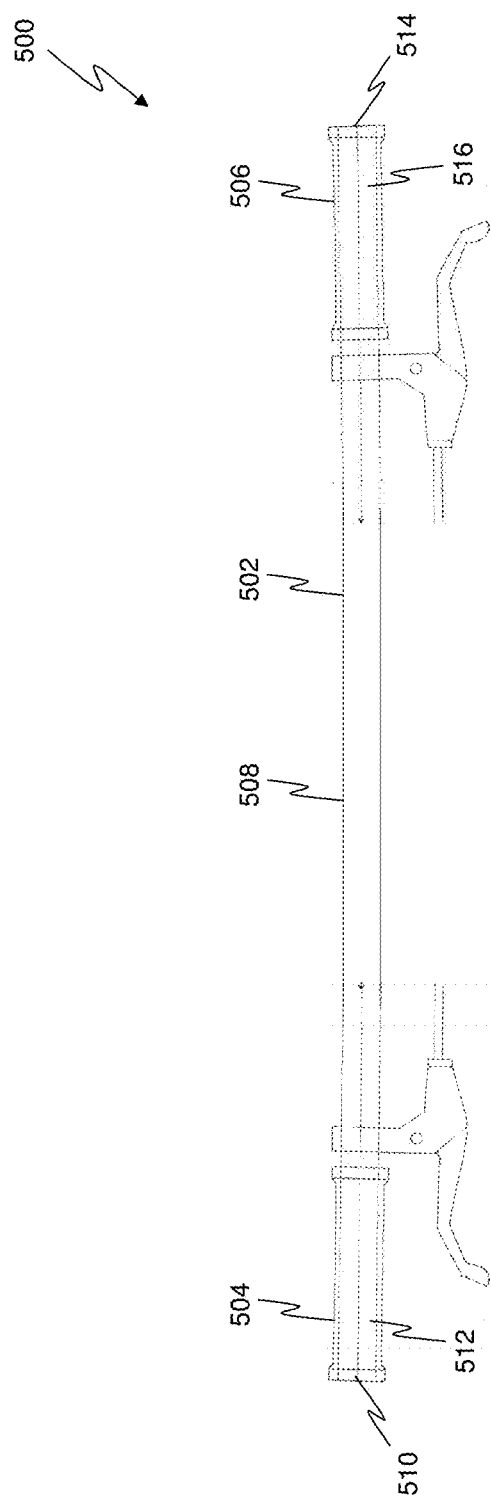
FIG. 7 shows a front/rear view of a bicycle handlebar, in accordance with the prior art.
Figure 8:
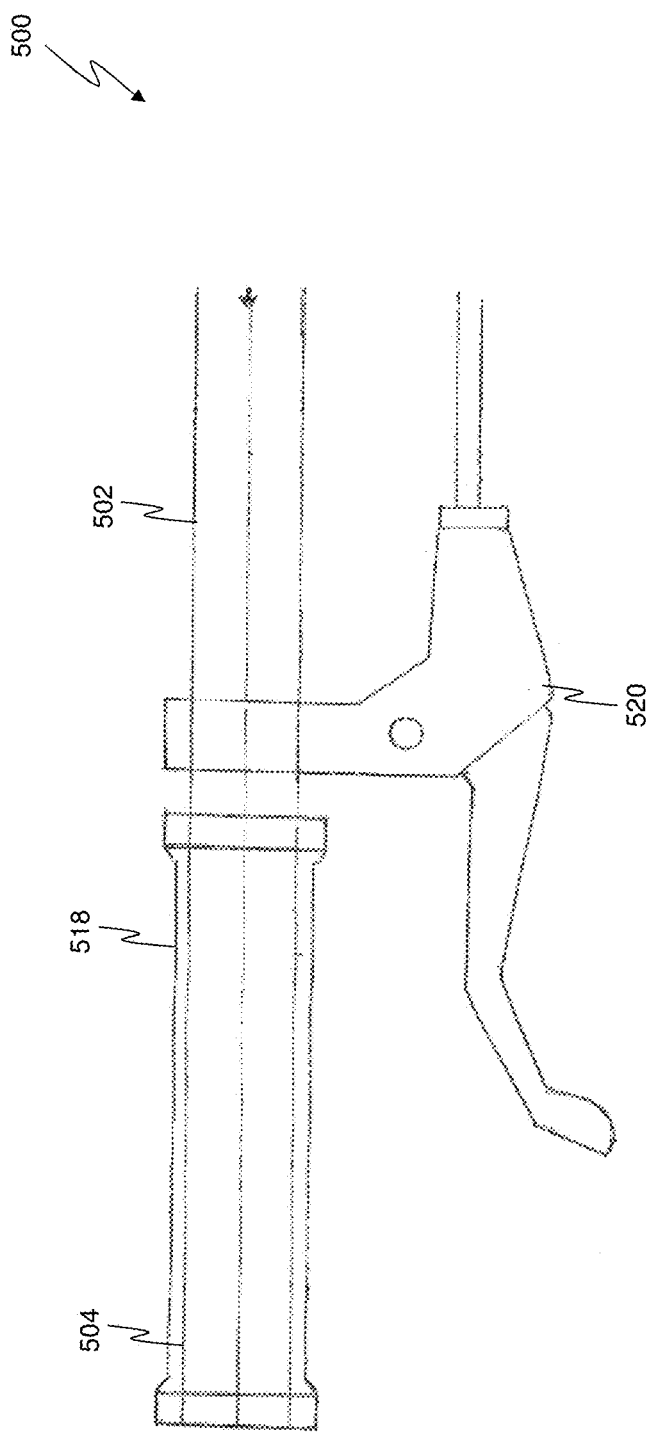
FIG. 8 shows one side of the bicycle handlebar of FIG. 7, in accordance with the prior art.
Figure 9:
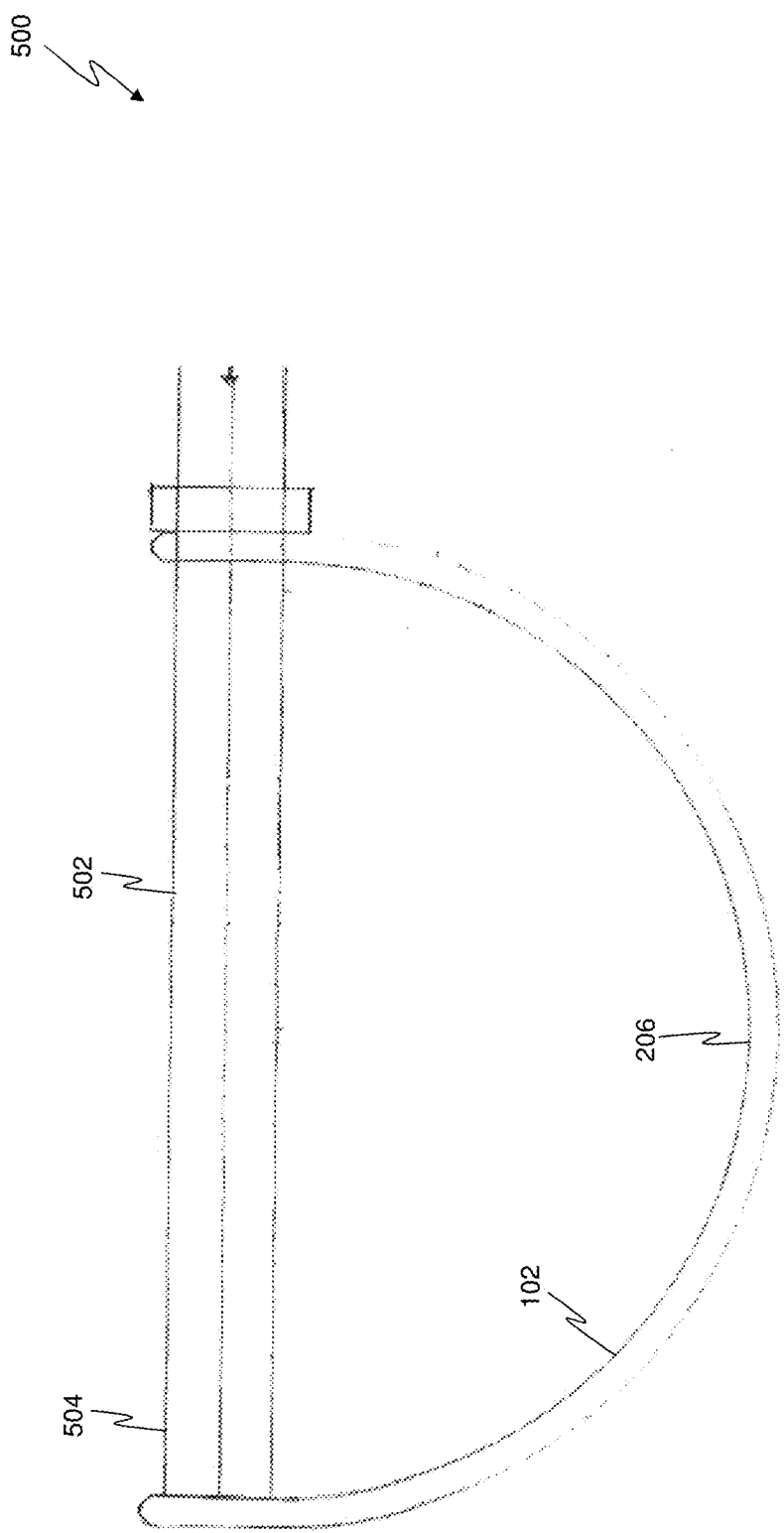
FIG. 9 shows one side of the bicycle handlebar of FIG. 7 with a handguard article associated therewith, in accordance with one embodiment of the invention.
Figure 10:
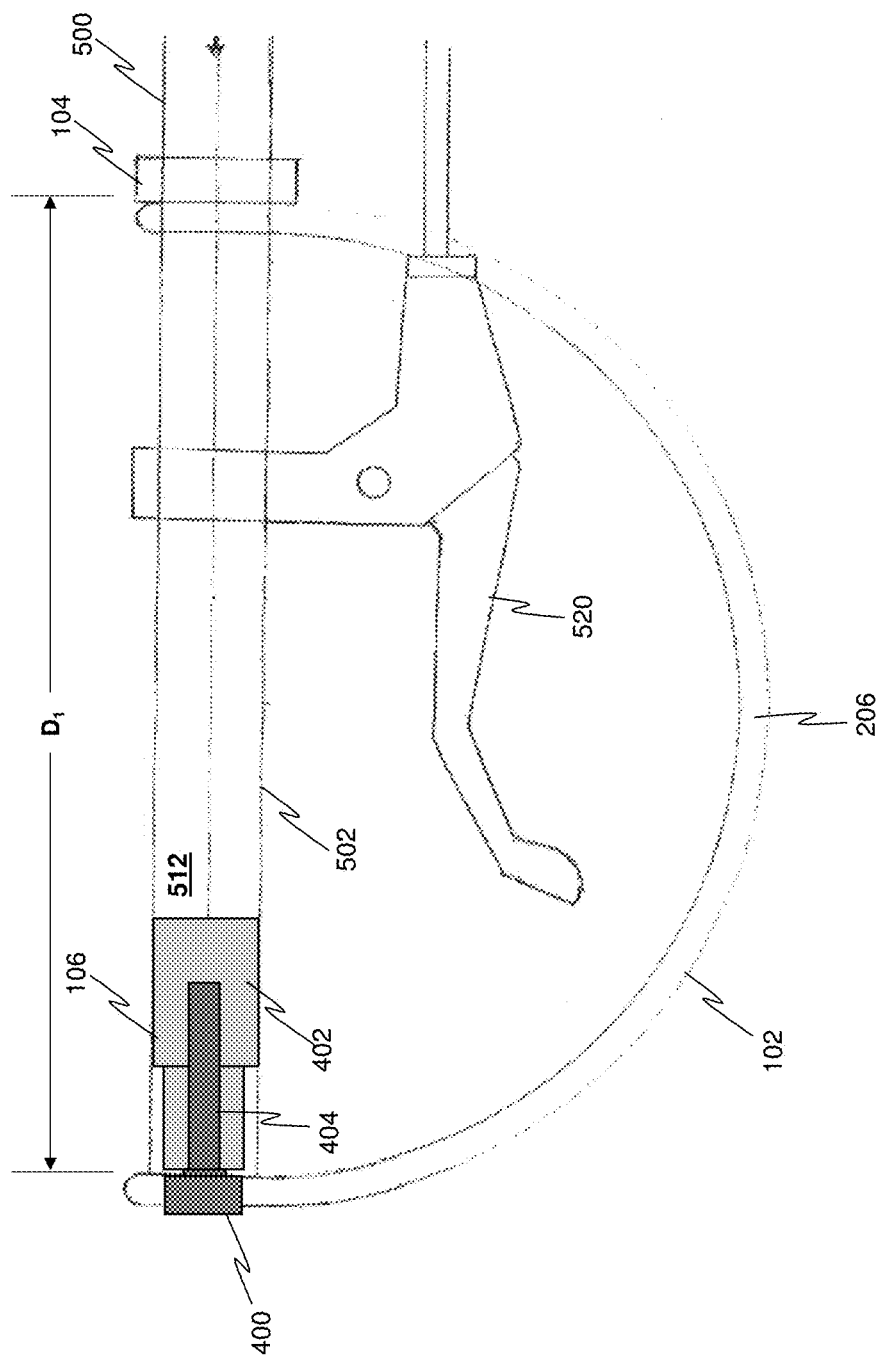
FIG. 10 shows one side of the bicycle handlebar of FIG. 7 with the handguard system of FIG. 1 associated therewith, in accordance with one embodiment of the invention.
Figure 11:
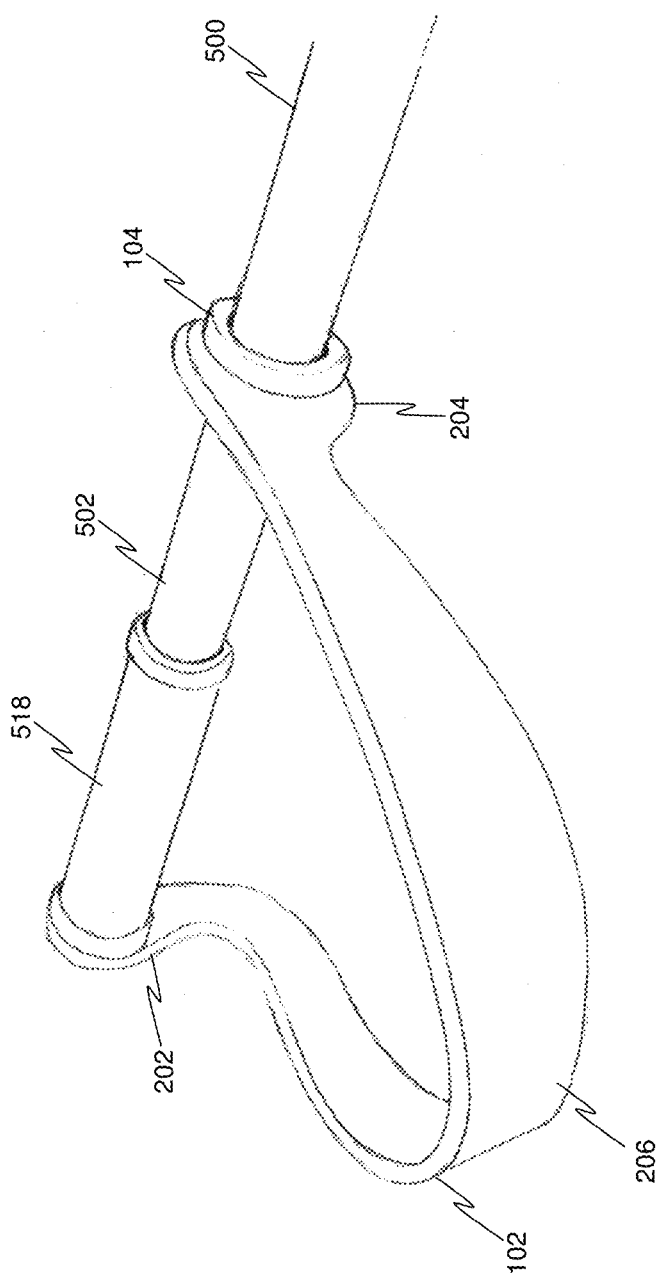
FIG. 11 shows one side of the bicycle handlebar of FIG. 7 with the handguard system of FIG. 1 associated therewith, in accordance with another embodiment of the invention.
Figure 12:
FIG. 12 shows a side perspective view of the handguard system of FIG. 1 associated with a handlebar of a bicycle, in accordance with one embodiment of the present invention.
Figure 13:
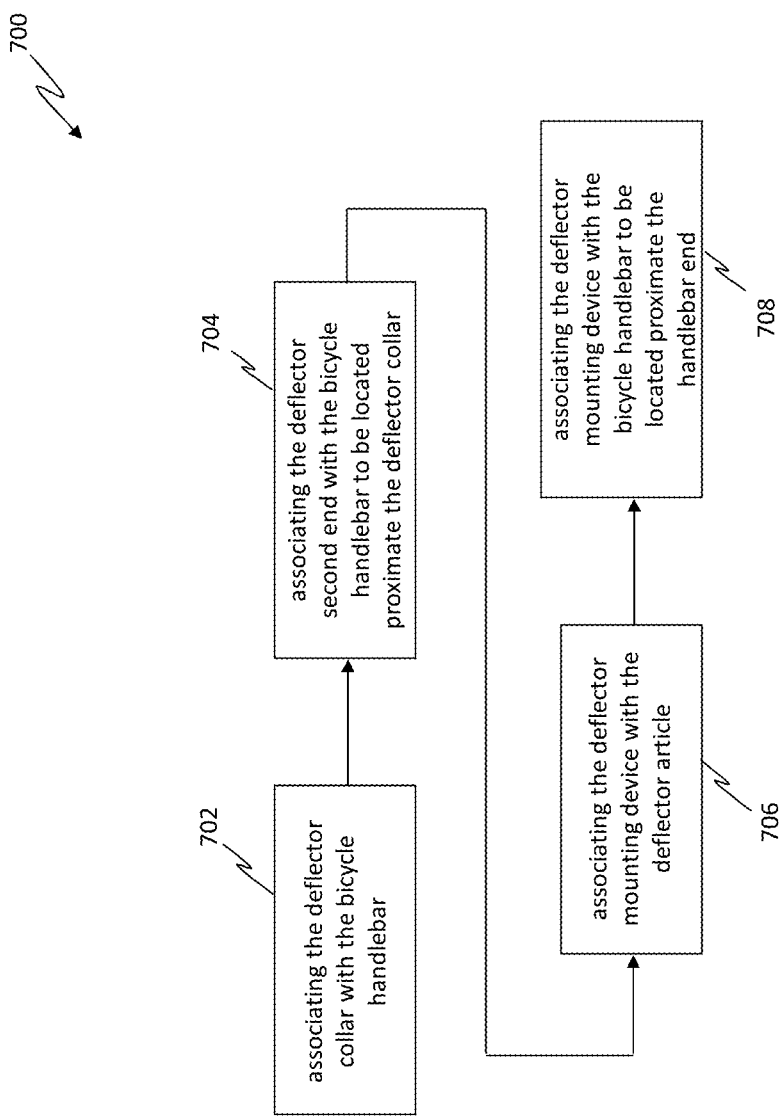
FIG. 13 shows a block diagram illustrating a method for associating the handguard article with a handlebar of a bicycle, in accordance with one embodiment of the present invention.

Referring to FIG. 6 and FIG. 7, one embodiment of the handlebar 500 of the bicycle 600 is shown, wherein the handlebar 500 typically includes a handlebar structure 502 having a handlebar first end 504, a handlebar second end 506 and a handlebar center portion 508. The handlebar first end 504 defines a handlebar first end opening 510 communicated with a handlebar first end cavity 512 and the handlebar second end 506 defines a handlebar second end opening 514 communicated with a handlebar second end cavity 516. It should be appreciated that in some embodiments, the handlebar center portion 508 may define a handlebar center portion cavity which communicates the handlebar first end cavity 512 with the handlebar second end cavity 516. As is known, the handlebar center portion 508 is typically mounted to the front of the bicycle 600 such that the handlebar first end 504 is located on one side of the bike and the handlebar second end 506 is located the opposite side of the bike. Moreover, when the handlebar 500 is rotated, the front tire of the bicycle 600 rotates in the direction that the handlebar 500 is rotated. Furthermore, it should be appreciated that the handlebar structure 502 is typically constructed from a rigid material, such as steel, aluminum, plastic and/or a composite material.

Referring again to FIG. 5B, it is contemplated that in one embodiment, the mounting device 106 may be configured as an expansion plug having a mounting device end cap 400, a mounting device expansion portion 402 and a mounting device adjustment screw 404, wherein the mounting device expansion portion 402 is configurable between an expansion portion first diameter $P_{D1}$ and an expansion portion second diameter $P_{D2}$ and wherein the expansion portion first diameter $P_{D1}$ is smaller than the expansion portion second diameter $P_{D2}$. As such, when the mounting device adjustment screw 404 is rotated in one direction, the mounting device adjustment screw 404 causes the mounting device expansion portion 402 to be configured into the expansion portion first diameter $P_{D1}$ thereby causing the mounting device expansion portion 402 to retract away from the inner walls of the handguard structure 302. When the mounting device adjustment screw 404 is rotated in the opposite direction, the mounting device adjustment screw 404 causes the mounting device expansion portion 402 to be configured into the expansion portion second diameter $P_{D2}$ thereby causing the mounting device expansion portion 402 to press against the inner walls of the handlebar structure 502, thereby securing the mounting device expansion portion 402 within the handlebar first end cavity 512 (and handlebar second end cavity 516).

This is because the mounting device expansion portion 402 includes a first expansion portion 406 and a second expansion portion 408, wherein the first expansion portion 406 and/or the second expansion portion 408 are movable relative to each other. It should be appreciated that the first expansion portion 406 includes an angled first interface portion 410 and the second expansion portion 408 includes an angled second interface portion 412, wherein the angled first interface portion 410 abuts the angled second interface portion 412. When the mounting device adjustment screw 404 is rotated in one direction, the first expansion portion 406 and the second expansion portion 408 are moved away from each other and the mounting device expansion portion 402 has an expansion portion first diameter $P_{D1}$. When the mounting device adjustment screw 404 is rotated in the opposite direction, the first expansion portion 406 and the second expansion portion 408 are moved toward each other thereby causing the first expansion portion 406 and the second expansion portion 408 to be compressed together at the interface of the angled first interface portion 410 and the angled second interface portion 412. This causes the first expansion portion 406 and/or the second expansion portion 408 to move outwardly and away from an imaginary axis $L_X$ that runs longitudinally through the mounting device adjustment screw 404 and the mounting device expansion portion 402 has an expansion portion second diameter $P_{D2}$.

Moreover, in accordance with one embodiment and referring to FIG. 5C, FIG. 5D, FIG. 5E, FIG. 5F and FIG. 5G, the mounting device end cap 400 includes a cap top 414, a handguard interface portion 416 and a cap expansion interface portion 418, wherein the handguard interface portion 416 is configured to associate with the first mounting opening 208 of the handguard article 102 and wherein the cap expansion interface portion 418 is configured to associate with the mounting device expansion portion 402. The handguard interface portion 416 and the first mounting opening 208 are shaped alike (i.e. in a keyed fashion) such that the handguard interface portion 416 snugly fits within the first mounting opening 208. In accordance with one embodiment of the invention, the handguard interface portion 416 is substantially square shaped with four (4) rounded corners. It should be appreciated that two (2) adjacent corners of the four (4) corners are rounded to have about a 2 mm radius (±15%) and the remaining two (2) adjacent corners of the four (4) corners are rounded to have about a 6 mm radius (±15%).

It should be appreciated that this design advantageously allows the handguard article 102 to be securely held in place and prevent rotation during use (i.e. prevents/limits rotation of the handguard article 102 due to 'normal' impact in the upward/downward direction during use), while still allowing the handguard article 102 to "controllably break" or "controllably rotate" about the handlebar structure when a predetermined upward and/or downward force (rotational) is applied to the handguard center portion 206. In one embodiment, that rotational force may be as desired and may vary to be between a range of about 35 lbs and about 70 lbs which is less than the amount of force that is necessary to break the wrist of a rider if the riders arm becomes trapped between the handguard article 102 and the bicycle handlebar. It should be appreciated that the variation in the predetermined range of upward and/or downward force may be due to a number of variables, such as temperature, how tight the handguard mounting device 104 is installed and/or the angle of impact. Moreover, the radii of the four (4) corners of the unique and novel handguard interface portion 416 were designed to create the "controllably break" feature within the predetermined range of upward and/or downward force. This helps to make the invention resilient enough to protect, deflect and absorb without being excessively rigid.

Referring to FIG. 8, FIG. 9, FIG. 10, FIG. 11, FIG. 12 and FIG. 13, a method 700 for associating the handguard article 102 with a handlebar 500 of a bicycle 600 is provided in accordance with one embodiment, wherein the handlebar 500 may include a handlebar cover 518 and bicycle controls 520 (such as break levers and/or gear levers). The method 700 includes associating the handguard collar 104 with the bicycle handlebar 500, as shown in operational block 702. This may include removing the handlebar cover 318 and/or the bicycle controls 320 (if include) from the handlebar first end 304 and securely associating the handguard collar 104 with the handlebar first end 504 to be located inward of the handlebar first end 504 toward the handlebar center portion 508. It should be appreciated that the handguard collar 104 should be located at a predefined distance $D_1$ from the end of the handlebar first end 504, wherein the predefined distance $D_1$ is sufficiently large to allow the handlebar cover 518 (if any) and the bicycle controls 520 to be remounted to the handlebar first end 504. The method 700 also includes associating the handguard second end 204 with the bicycle handlebar 500 to be located proximate the handguard collar 104, as shown in operational block 704. The includes associating the handguard second end 204 of the handguard article 102 with the handlebar first end 504 such that the handlebar structure 502 of the handlebar first end 504 is inserted into and through the second mounting opening 210 and the handguard second end 204 is located proximate to the handguard collar 104, wherein the handguard second end 204 may abut the handguard collar 104. It should be appreciated that the second mounting opening diameter $M_d$ may be sized to allow the handlebar 500 to slide through the second mounting opening 210 until the handguard article 102 is located a predefined distance $D_1$ from the end of the handlebar first end 504. It should be further appreciated that if the handlebar 500 does include a handlebar cover 518, then the handlebar cover 518 may be installed following the association of the handguard second end 204 with the handlebar 500.

The method 700 further includes associating the handguard mounting device 106 with the handguard article 102, as shown in operational block 706. This may include associating the mounting device end cap 400 with the handguard first end 202 such that at least one of the mounting device adjustment screw 404 and/or a portion of the mounting device end cap 400 is inserted into the first mounting opening 208 of the handguard first end 202. Because the end cap is larger than the first mounting opening 208, a portion of the mounting device end cap 400 will abut the handguard article 102 and the mounting device adjustment screw 404 will protrude out of the other side of the handguard article 102. The mounting device adjustment screw 404 may be rotated until the mounting device expansion portion 402 has a diameter $P_D$ which may be substantially equal to the expansion portion first diameter $P_{D1}$. The method 700 further includes associating the handguard mounting device 106 with the bicycle handlebar 500 to be located proximate the end of the bicycle handlebar 500, as shown in operational block 708. This may be accomplished by bending the handguard article 102 until the handguard first end 202 is located proximate the handlebar first end opening 510. This will cause the handguard center portion 206 to form an arch shape extending outward (in a substantially perpendicular direction) from the handlebar first end 504 and covering or protecting the handlebar first end 504.

The mounting device expansion portion 402 is inserted through the handlebar first end opening 510 to be located within the handlebar first end cavity 512. The mounting device end cap 400 then abuts the handlebar first end opening 510 to cover and/or be partially located within the handlebar first end cavity 512. The mounting device adjustment screw 404 is then rotated to cause the mounting device expansion portion 402 to be configured to have a diameter $P_D$ which is substantially equal to the expansion portion second diameter $P_{D2}$. This causes the mounting device expansion portion 402 to press against the interior walls of the handlebar structure 502 thereby securing the mounting device expansion portion 402 within the handlebar first end cavity 512, the mounting device 106 to the handlebar first end 504 and the handguard article 102 to the handlebar first end 504. This may be repeated to install a handguard article 102 on the handlebar second end 506.

Referring again to FIG. 3, it should be appreciated that due to the tendency of the handguard first end 202 and the handguard second end 204 to naturally have a force pushing outwardly and away from the imaginary plane DCP extending through the handguard center portion 206, the handguard second end 204 will push against the handguard collar 104 thereby allowing the handguard article 102 to maintain its protective arch shape. Moreover, it should be appreciated that, in one embodiment, the handguard article 102 may be at least partially constructed from a polymer material that is strong and flexible, wherein the material may be approximately ¼ inch thick and may be able to exceed a bend radius of between 3.5 and 5.5 inches. In one embodiment, the handguard article 102 may be at least partially constructed from a material that has the characteristic of being stiff yet elastically deflectable and that may allow for the handguard article 102 to be bent at an angle of between 0 degrees and 180 degrees yet still be sufficiently strong enough to endure a static load of between 10 lbs and 100 lbs (in one embodiment, one such material may be an Ultra Height Molecular Weight Polyethylene (UHMW) and/or the static load may be 75 lbs). For example, in one embodiment, the handguard article 102 is sufficiently and resiliently strong enough to elastically deflect and endure a 10 pound weight that is dropped from a height of 4 feet high (which created a force at impact of approximately 100 lbs) and that directly impacts the handguard center portion 206.

In yet another embodiment, the handguard article 102 may be pre-shaped into an arch shape and made from a material that is resistant to impact. In still yet another embodiment, the handguard article 102 may be pre-shaped into a rectangular shape. In still yet other embodiments, the handguard article may be constructed from any material suitable to the desired end purpose, such as a plastic material, a polymer material, a polyethylene material, a hybrid polyethylene material, a polyethylene blend material, and/or a composite material.

It should be appreciated that, in accordance with the present invention, the design of the handguard system 100 advantageously allows for the handguard article 102 to be securely mounted to the handlebars 500 of a bicycle 600, wherein the handguard article 102 may be rotated about an imaginary axis that runs parallel through the ends of the handlebar 500 (i.e. the handlebar first end 504 and the handlebar second end 506). This allows the handguard article 102 to be adjustably positionable to best cover and protect the hand of the rider and the bicycle controls (if any). Moreover, it should be appreciated that the offset angle α of the handguard second end 204 may be selected to allow the handguard article 102 to be positionable to better cover and protect the hand of the rider and any bicycle controls thereunder. Moreover, it is contemplated that in at least one embodiment, the first handguard end 202 and/or the second handguard end 204 may be more rigid and less elastically deflectable than the handguard middle portion 206. Moreover, it should be appreciated that the handguard article 102 may have a uniform thickness and/or varying thickness and may be any thickness desired suitable to the desired end purpose, such as for example ¼ inch, 3/16 inch and/or 5/16 inch. Additionally, the size of the handguard article 102 may be any size desired suitable to the desired end purpose. For example, in one embodiment the handguard article 102 is about 15½ inches long (±15%) and 2½ inches wide (±15%).

It should be appreciated that while the invention has been described with reference to an exemplary embodiment, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Moreover, it is contemplated that elements of one embodiment may be combined with elements of other embodiments as desired. Therefore, it is intended that the invention not be limited to a particular embodiment disclosed herein as the best mode contemplated for carrying out this invention, but that the invention will include all embodiments (individually and/or combined) falling within the scope of the appended claims and/or information. Moreover, unless specifically stated any use of the terms first, second, etc. do not denote any order or importance, but rather the terms first, second, etc. are used to distinguish one element from another.

We claim:

1. A handguard system for a handlebar of a bicycle, comprising:
a handguard article, wherein the handguard article is elastically deformable and includes a handguard first end communicated with a handguard second end via handguard center portion, wherein the handguard second end is configured to associate with the handlebar;
a handguard collar, wherein the handguard collar includes a handguard collar structure which defines a collar cavity configured to contain the handlebar and having a collar cavity diameter CCD which is configurable between a first collar cavity diameter $CC_{D1}$ and a second collar cavity diameter $CC_{D2}$; and
a handguard mounting device, wherein the handguard mounting device is configured to securingly associate with the handguard first end and the handlebar,
wherein when the handguard article is securingly associated with the handlebar, the handguard center portion is configured to cover a portion of the handlebar, and
wherein the handguard center portion is more elastically deformable than the handguard first end and handguard second end and wherein the handguard center portion is configured to be flexibly bendable and able to structurally withstand being bent about a bend radius of between 3.5 and 5.5 inches.

2. The handguard system of claim 1, wherein the handguard second end is angled at an angle α relative to the handguard center portion.

3. The handguard system of claim 1, wherein the handguard mounting device includes a mounting device expansion portion having an expansion portion diameter, wherein the expansion portion diameter is configurable between a first expansion portion diameter and a second expansion portion diameter.

4. The handguard system of claim 1, wherein the handguard article is at least partially constructed from at least one of a polymer material, a composite material and a plastic material.

5. The handguard system of claim 1, wherein the handguard article is constructed from an elastically deflectable material which is capable of being elastically bent between 0 degrees and 180 degrees.

6. The handguard system of claim 1, wherein the handguard article is constructed from an elastically deflectable material which is capable of enduring a static load of between 10 lbs and 100 lbs.

7. The handguard system of claim 1, wherein the handguard collar is configured to be securably associated with the handlebar via at least one of a quick release clamp, a friction fit device and a screw.

8. The handguard system of claim 1, wherein the handguard article includes a mounting device expansion portion having an expansion portion diameter which is configurable between a first expansion portion diameter and a second expansion portion diameter.

9. The handguard system of claim 8, wherein the handlebar of the bicycle includes a handlebar end which defines a handlebar end cavity.

10. The handguard system of claim 9, wherein the mounting device expansion portion is configured to be located within the handlebar end cavity, wherein when the mounting device expansion portion diameter is equal to the second expansion portion diameter, the mounting device expansion portion is securely contained within the handlebar end cavity.

11. The handguard system of claim 10,
wherein the handguard second end defines a second mounting opening configured to contain a portion of the handlebar end such that the handguard second end is located proximate the handguard collar, and
wherein the handguard first end defines a first mounting opening configured to allow the handguard first end to securely associate with the handguard mounting device.

12. The handguard system of claim 11, wherein when the handguard is securely associated with the handlebar such that the handguard second end is located proximate the handguard collar and the handguard first end is securely associated with the handguard mounting device and the handguard mounting device is securely contained within the handlebar end cavity, the handguard center portion is bent into an arch shape to cover a portion of the handlebar end.

* * * * *